US012254544B2

United States Patent
Zhang et al.

(10) Patent No.: US 12,254,544 B2
(45) Date of Patent: Mar. 18, 2025

(54) IMAGE-TEXT FUSION METHOD AND APPARATUS, AND ELECTRONIC DEVICE

(71) Applicant: HUAWEI TECHNOLOGIES CO., LTD., Shenzhen (CN)

(72) Inventors: Wenjie Zhang, Nanjing (CN); Weicai Zhong, Xi'an (CN); Liang Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 504 days.

(21) Appl. No.: 17/634,002

(22) PCT Filed: Aug. 4, 2020

(86) PCT No.: PCT/CN2020/106900
§ 371 (c)(1),
(2) Date: Feb. 9, 2022

(87) PCT Pub. No.: WO2021/036715
PCT Pub. Date: Mar. 4, 2021

(65) Prior Publication Data
US 2022/0319077 A1 Oct. 6, 2022

(30) Foreign Application Priority Data
Aug. 23, 2019 (CN) .......................... 201910783866.7

(51) Int. Cl.
*G06T 11/60* (2006.01)
*G06T 11/00* (2006.01)
(Continued)

(52) U.S. Cl.
CPC ............ *G06T 11/60* (2013.01); *G06T 11/001* (2013.01); *G06V 10/44* (2022.01); *G06V 10/462* (2022.01);
(Continued)

(58) Field of Classification Search
CPC ......... G06T 11/60; G06T 11/001; G06T 5/30; G06T 5/40; G06T 5/70; G06T 7/11;
(Continued)

(56) References Cited

U.S. PATENT DOCUMENTS 11,189,066 B1 * 11/2021 Bylinskii ................. G06N 3/02
2011/0173532 A1    7/2011 Forman et al.
(Continued)

FOREIGN PATENT DOCUMENTS

CN       101123002 A    2/2008
CN       102890826 A    1/2013
(Continued)

OTHER PUBLICATIONS

Yang et al., "Automatic Generation of Visual-Textual Presentation Layout", ACM Transactions on Multimedia Computing Communications and Applications, Association for Computing Machinery, US, vol. 12, No. 2, Feb. 9, 2016, 22 pages.
(Continued)

*Primary Examiner* — Said Broome
*Assistant Examiner* — Andrew Shin
(74) *Attorney, Agent, or Firm* — Maier & Maier, PLLC

(57) ABSTRACT

This application relates to the field of digital image processing technologies, and discloses an image-text fusion method and apparatus, and an electronic device, to minimize blockage of a saliency feature in an image by a text when the text is laid out in the image, and obtain a higher visual balance degree after the text is laid out in the first image, thereby achieving a better layout effect. According to the method of this application, first, a plurality of candidate text templates and layout positions of a plurality of corresponding texts in an image can be determined, so that a text laid out in the image does not block a visually salient object having a greater feature value, such as a human face or a building.

(Continued)

Then based on magnitudes of feature values of pixels blocked by the text, a balance degree of feature value distribution of pixels in each region in the image in which the text is laid out, and the like when the text is laid out in the image at corresponding layout positions in the image by using different text templates, a final text template of the text and a layout position of the text in the image are determined.

20 Claims, 27 Drawing Sheets

(51) Int. Cl.
    *G06V 10/44*     (2022.01)
    *G06V 10/46*     (2022.01)
    *G06V 10/54*     (2022.01)
    *G06V 10/56*     (2022.01)
    *G06V 20/62*     (2022.01)
    *G06V 40/16*     (2022.01)

(52) U.S. Cl.
    CPC .............. *G06V 10/54* (2022.01); *G06V 10/56* (2022.01); *G06V 20/62* (2022.01); *G06V 40/168* (2022.01)

(58) Field of Classification Search
    CPC .. G06T 7/13; G06T 7/136; G06T 7/40; G06V 10/44; G06V 10/462; G06V 10/54; G06V 10/56; G06V 20/62; G06V 40/168; G06V 10/80; G06V 40/16
    See application file for complete search history.

(56) References Cited

U.S. PATENT DOCUMENTS

2016/0093059 A1\*   3/2016   Tumanov ................ G06T 11/60
                                                             382/173
2016/0180161 A1    6/2016   Novak et al.

FOREIGN PATENT DOCUMENTS

| | | |
|---|---|---|
| CN | 107103635 A | 8/2017 |
| CN | 109117713 A | 1/2019 |
| CN | 109493399 A | 3/2019 |
| CN | 109643222 A | 4/2019 |
| CN | 110009712 A | 7/2019 |
| CN | 110706310 A | 1/2020 |
| WO | 2013005366 A1 | 1/2013 |

OTHER PUBLICATIONS

Malu et al., "An Approach to Optimal Text Placement on Images", Jul. 21, 2013, arxiv. org, 7 pages.

Jia et al., "Image-Based Label Placement for Augmented Reality Browsers", 2018 IEEE 4th International Conference on Computer and Communications, Dec. 7, 2018, 6 pages.

Grasset et al., "Image-Driven View Management for Augmented Reality Browsers", 2012, IEEE International Symposium on Mixed and Augmented Reality, IEEE, Nov. 5, 2012, 10 pages.

Rosten et al., "Real-Time Video Annotations for Augmented Reality", In: "Advances in Databases and Information Systems", Jan. 1, 2005, Springer International Publishing, Cham 032682, vol. 3804, 9 pages.

Tanaka et al., "An information Layout Method for an Optical See-through Head Mounted Display Focusing on the Viewability", 2008. ISMAR2008. 7th IEEE/ACM International Symposium on Mixed and Augmented Reality, IEEE, Piscataway, NJ, USA, Sep. 15, 2008, 4 pages.

Rakholia et al., "Where to Place: A Real-Time Visual Saliency Based Label Placement for Augmented Reality Applications", 2018, 25th IEEE International Conference on Image Processing, IEEE, Oct. 7, 2018, 5 pages.

\* cited by examiner

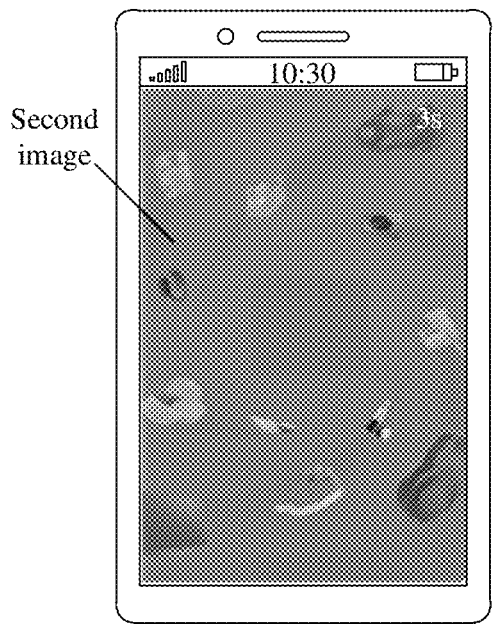
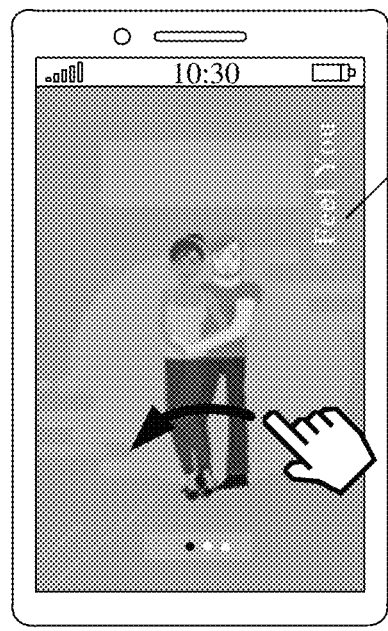
FIG. 4(a)  FIG. 4(b)
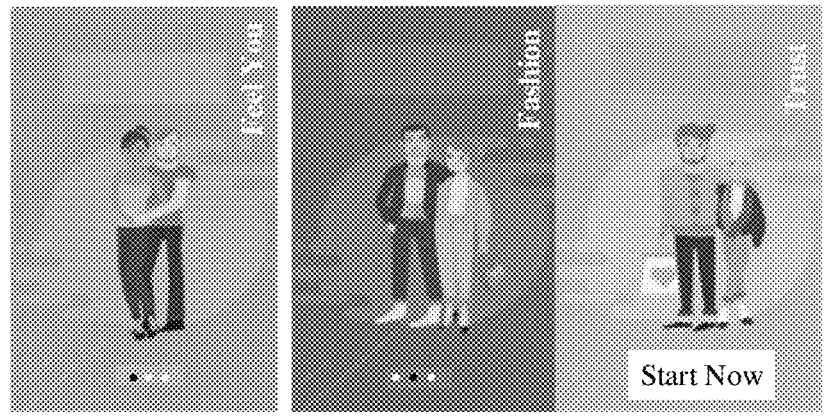
FIG. 4(c)

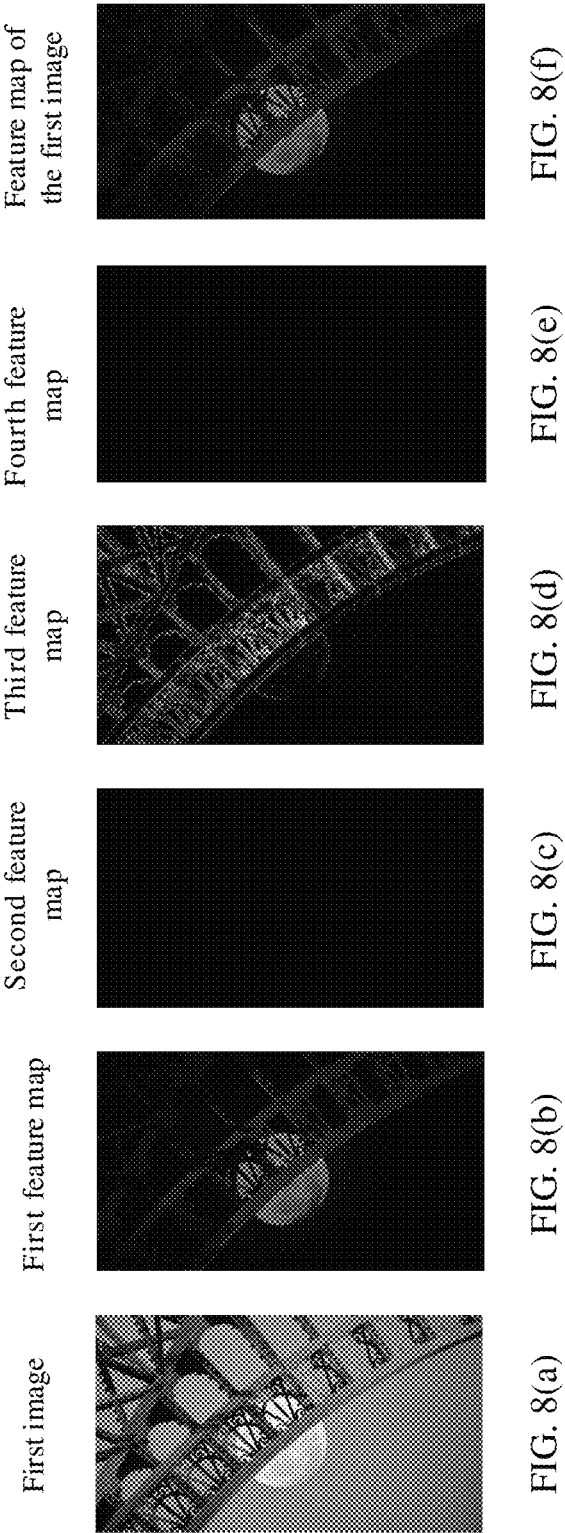

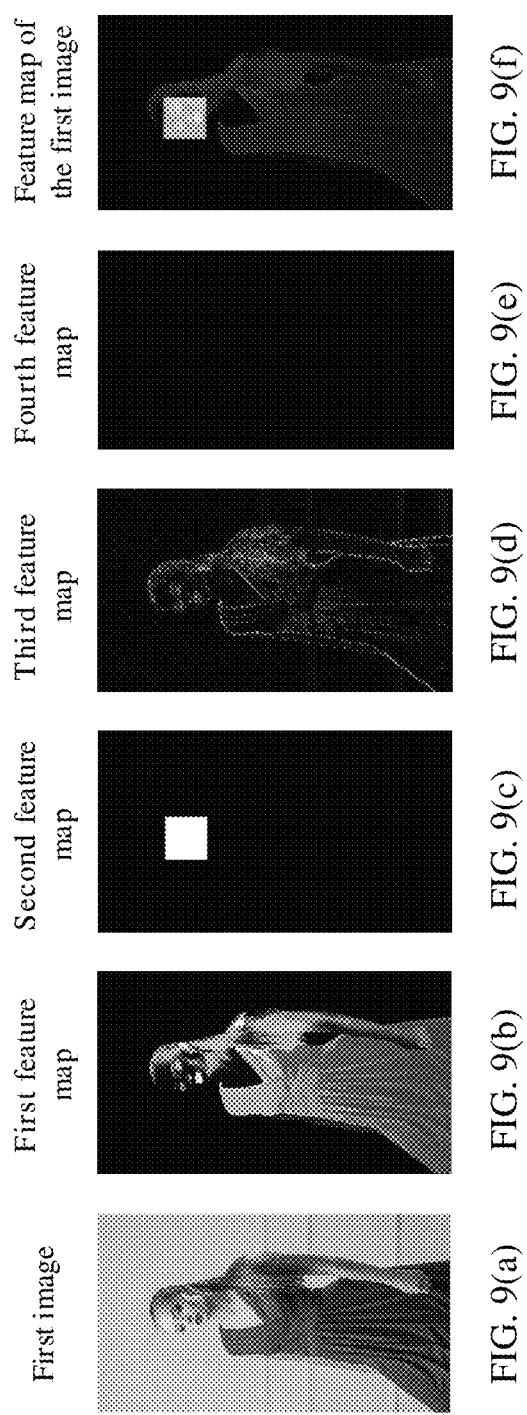

```
'Template ID': 'template 1'
"position information": {
    "lower left": {
        "decorative line": {
            "left": 96,
            "bottom": 32,
            "width": 672,
            "line width": 6},
        "text region": {
            "left": 96,
            "bottom": 42,
            "width": 662,
            "height": 619},
    }
    ...
}
"title size": 29,
"title line spacing": 2.5,
"title line width": 100,
"text format": TrueType,
"text font size": 14,
"text line spacing": 1.5,
"text line width": 100,
"text alignment mode": text left alignment,
...
```

FIG. 14

Glistening White Jade Plate

A full moon half blocked by the Eiffel Tower, is like a shy girl with her face half hidden behind a lute
@yikemedia
View More>

FIG. 16(a)

Glistening White Jade Plate

A full moon half blocked by the Eiffel Tower, is like a shy girl with her face half hidden behind a lute
@yikemedia
View More>

FIG. 16(b)

Glistening White Jade Plate

A full moon half blocked by the Eiffel Tower, is like a shy girl with her face half hidden behind a lute.
@yikemedia
View More>

FIG. 16(c)

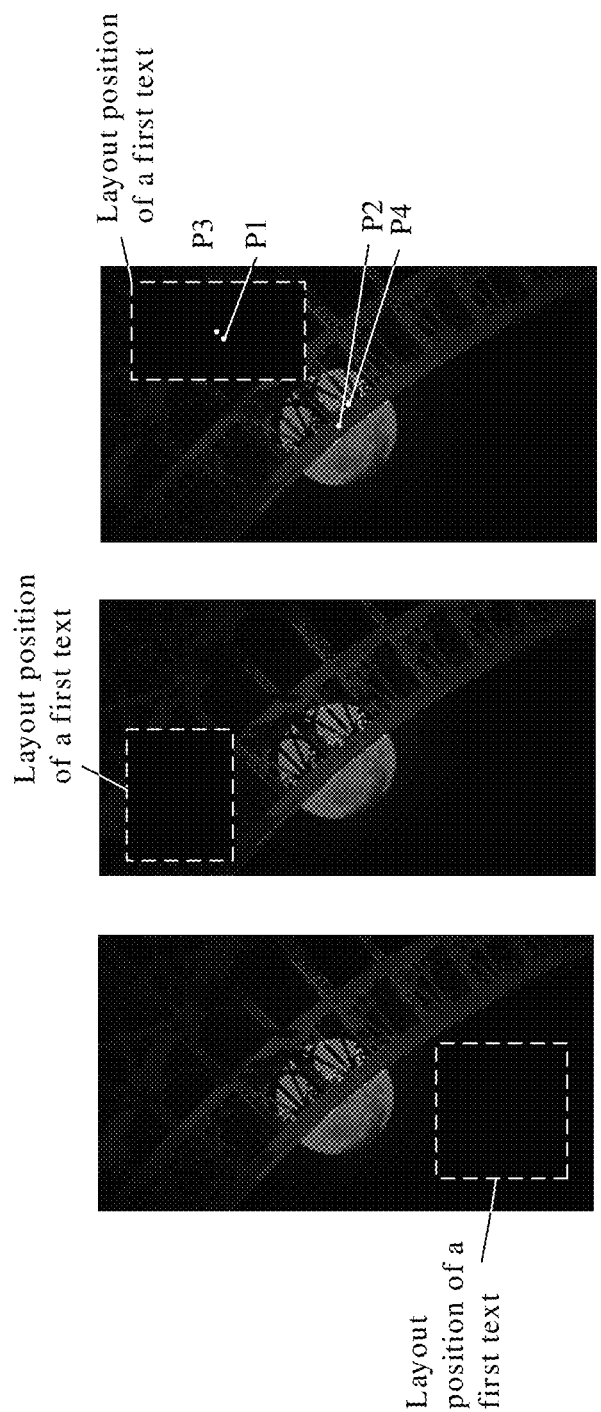

IMAGE-TEXT FUSION METHOD AND APPARATUS, AND ELECTRONIC DEVICE

CROSS-REFERENCE TO RELATED APPLICATIONS

This application is a national stage of International Application No. PCT/CN2020/106900, filed on Aug. 4, 2020, which claims priority to Chinese Patent Application No. 201910783866.7, filed on Aug. 23, 2019. Both of the aforementioned applications are hereby incorporated by reference in their entireties.

TECHNICAL FIELD

Embodiments relate to the field of digital image processing technologies, and in particular, to an image-text fusion method and apparatus, and an electronic device.

BACKGROUND

With rapid development of multimedia technologies and Internet technologies, image-text fusion layouts are used more extensively. Examples are a lock screen wallpaper of a mobile phone, an advertisement-supported video during starting of an application (APP), and a floating advertising box in a video window.

In an image-text fusion layout process, how to make a text avoid a salient object (such as a human face, a flower, or a building) in an image exactly and how to select a better text layout mode in a candidate region of the text avoiding the salient object are problems to be resolved.

SUMMARY

Embodiments provide an image-text fusion method, to achieve a better layout effect when a text is laid out in an image.

To achieve the foregoing objective, the following solutions are used in the embodiments.

According to a first aspect, an image-text fusion method is provided, where the method includes: obtaining a first image and a first text to be laid out in the first image; determining a feature value of each pixel in the first image, where a feature value of a pixel is used to represent a probability that a user pays attention to the pixel, and if the feature value of the pixel is greater, the probability that the user pays attention to the pixel is higher; determining a plurality of first layout formats of the first text in the first image based on the first text and the feature value of each pixel in the first image, where when the first text is laid out in the first image based on each first layout format, the first text does not block a pixel whose feature value is greater than a first threshold; determining a second layout format from the plurality of first layout formats based on cost parameters of the plurality of first layout formats, where a cost parameter of a first layout format is used to represent a magnitude of a feature value of a pixel blocked by the first text when the first text is laid out in the first image based on the first layout format, and a balance degree of feature value distribution of pixels in each region in the first image in which the first text is laid out; and laying out the first text in the first image based on the second layout format to obtain a second image.

According to the solution provided in the first aspect, a plurality of candidate text templates and layout positions of a plurality of corresponding texts in an image can be determined, so that a text laid out in the image does not block a visually salient object having a greater feature value, such as a human face or a building. Then based on magnitudes of feature values of pixels blocked by the text, a balance degree of feature value distribution of pixels in each region in the image in which the text is laid out, and the like when the text is laid out in the image at corresponding layout positions in the image by using different text templates, a final text template of the text and a layout position of the text in the image are determined, thereby achieving a better layout effect.

In a possible implementation, the determining a feature value of each pixel in the first image includes: determining at least two parameters of a visual saliency parameter, a face feature parameter, an edge feature parameter, and a text feature parameter of each pixel in the first image, where a visual saliency parameter of a pixel is used to represent a probability that the pixel is a pixel corresponding to a visual saliency feature, a face feature parameter of the pixel is used to represent a probability that the pixel is a pixel corresponding to a face, an edge feature parameter of the pixel is used to represent a probability that the pixel is a pixel corresponding to an object contour, and a text feature parameter of the pixel is used to represent a probability that the pixel is a pixel corresponding to a text; and separately performing weighted summation on the determined at least two parameters of the visual saliency parameter, the face feature parameter, the edge feature parameter, and the text feature parameter of each pixel in the first image to determine the feature value of each pixel in the first image. The feature value of each pixel may be determined by comprehensively considering at least two parameters of the visual saliency parameter, the face feature parameter, the edge feature parameter, and the text feature parameter, and a probability that a user pays attention to the feature corresponding to each parameter. Therefore, a probability that the layout position of the text determined based on the feature value does not block a saliency feature is higher.

In a possible implementation, before the separately performing weighted summation on the determined at least two parameters of the visual saliency parameter, the face feature parameter, the edge feature parameter, and the text feature parameter of each pixel in the first image to determine the feature value of each pixel in the first image, the method further includes: separately generating at least two feature maps based on the determined at least two parameters of the visual saliency parameter, the face feature parameter, the edge feature parameter, and the text feature parameter of each pixel in the first image, where a pixel value of each pixel in each feature map is a corresponding parameter of the corresponding pixel; and the separately performing weighted summation on the determined at least two parameters of the visual saliency parameter, the face feature parameter, the edge feature parameter, and the text feature parameter of each pixel in the first image to determine the feature value of each pixel in the first image includes: performing weighted summation on pixel values of each pixel in the at least two feature maps to determine the feature value of each pixel in the first image. Weighted summation is performed on at least two of feature maps respectively used to represent the visual saliency parameter, the face feature parameter, the edge feature parameter, and the text feature parameter with reference to a probability that a user pays attention to the feature corresponding to each parameter, to determine the feature value of each pixel. Therefore, a probability that the layout position of the text determined based on the feature value does not block a saliency feature is higher.

In a possible implementation, the determining a plurality of first layout formats of the first text in the first image based on the first text and the feature value of each pixel in the first image includes: determining the plurality of first layout formats based on the feature value of each pixel in the first image and a size of a text box of the first text when the first text is laid out by using one or more text templates. By comprehensively analyzing a size of a region occupied when the first text is laid out by using different text templates and the feature value of each pixel in the first image, it can be ensured that the saliency feature in the first image is not blocked when the first text is laid out at the determined layout position of the text.

In a possible implementation, the method further includes: obtaining the one or more text templates, where each of the text templates specifies at least one of a line spacing, a line width, a font size, a font, a character thickness, an alignment mode, a decorative line position, and a decorative line thickness of a text. The first text may be laid out by using different text templates, so that flexibility is high, and an image-text fusion effect is better.

In a possible implementation, the determining a second layout format from the plurality of first layout formats based on cost parameters of the plurality of first layout formats includes: determining a texture feature parameter of an image region that is in the first image and is blocked by the text box of the first text when the first text is laid out in the first image based on the plurality of first layout formats separately, where the texture feature parameter is used to represent a quantity of texture features corresponding to the image region in the image; selecting, from the plurality of first layout formats, a plurality of first layout formats corresponding to image regions whose texture feature parameters are less than a second threshold; and determining the second layout format from the plurality of selected first layout formats based on a cost parameter of each selected first layout format. By discarding a complex texture region as a text layout position, the impact of the texture feature of the region on saliency of the first text can be avoided, and blockage of a texture feature in the region is avoided when the first text is laid out in the region.

In a possible implementation, the method further includes: performing at least two of step a, step b, and step c, and step d for each of the plurality of first layout formats, to obtain a cost parameter of each first layout format: step a: calculating a text intrusion parameter of the first text when the first text is laid out in the first image based on a first layout format, where the text intrusion parameter is a ratio of a first parameter to a second parameter, where the first parameter is a sum of feature values of pixels in an image region blocked by the first text in the first image, and the second parameter is an area of the image region, or the second parameter is a total quantity of pixels in the image region, or the second parameter is a product of a total quantity of pixels in the image region and a preset value; step b: calculating a visual space occupation parameter of the first text when the first text is laid out in the first image based on the first layout format, where the visual space occupation parameter is used to represent a proportion of pixels whose feature values are less than a third threshold in the image region; step c: calculating a visual balance parameter of the first text when the first text is laid out in the first image based on the first layout format, where the visual balance parameter is used to represent a degree of impact of the first text on the balance degree of feature value distribution of pixels in each region in the first image in which the first text is laid out; and step d: calculating a cost parameter of the first layout format based on at least two of the calculated text intrusion parameter, visual space occupation parameter, and visual balance parameter of the first text. By comprehensively considering a specific case of the first text blocking the feature value of the image region when the first text is laid out in different candidate layout formats, and the degree of impact of the first text on the balance degree of feature value distribution of pixels in each region in the first image, a better layout format may be determined from a plurality of candidate layout formats.

In a possible implementation, the calculating a cost parameter of the first layout format based on at least two of the calculated text intrusion parameter, visual space occupation parameter, and visual balance parameter of the first text includes: using $T_i=\lambda_1*E_s(L_i)+\lambda_2*E_u(L_i)+\lambda_3*E_n(L_i)$, or $T_i=(\lambda_1*E_s(L_i)+\lambda_2*E_u(L_i))*E_n(L_i)$, or $T_i=E_s(L_i)*E_u(L_i)*E_n(L_i)$ to calculate the cost parameter $T_i$ of the first layout format, where $E_s(L_i)$ is the text intrusion parameter of the first text when the first text is laid out in the first image based on the first layout format, $E_u(L_i)$ is the visual space occupation parameter of the first text when the first text is laid out in the first image based on the first layout format, $E_n(L_i)$ is the visual balance parameter of the first text when the first text is laid out in the first image based on the first layout format, and $\lambda_1$, $\lambda_2$, and $\lambda_3$ are weight parameters corresponding to $E_s(L_i)$, $E_u(L_i)$, and $E_n(L_i)$. By using the foregoing calculation method, and comprehensively considering a specific case of the first text blocking the feature value of the image region when the first text is laid out in different candidate layout formats, a cost parameter corresponding to each candidate layout format is calculated.

In a possible implementation, the determining a second layout format from the plurality of first layout formats based on cost parameters of the plurality of first layout formats includes: determining that a first layout format corresponding to a smallest cost parameter among the cost parameters of the plurality of first layout formats is the second layout format. By determining that a candidate layout format corresponding to the minimum value of the cost parameter is a final text layout format, an aesthetic effect obtained after the first text is laid out in the first image can be ensured to a maximum extent.

In a possible implementation, the method further includes: determining a color parameter of the first text, where the color parameter of the first text is a derivative color of a dominant color of an image region blocked by the first text in the first image when the first text is laid out in the first image based on the second layout format, and the derivative color of the dominant color is a color having a same hue as the dominant color but having a tone, saturation, and brightness different from an HSV of the dominant color; and coloring the first text in the second image based on the color parameter of the first text to obtain a third image. The first text is colored by using the derivative color of the dominant color of the image region that may be blocked by the first text in the first image, so that after the first text is laid out in the first image, the color of the first text is more coordinated with a background image, and the display is clearer.

In a possible implementation, the dominant color of the image region blocked by the first text in the first image is determined based on tones, saturation, and brightness of three primary colors RGB of the image region blocked by the first text in the first image in an HSV space when the first text is laid out in the first image based on the second layout format; and the dominant color is a hue with a highest hue proportion in the image region. The dominant color of the image region is determined based on tones, saturation, and brightness of the image region that may be blocked by the first text in the first image, and further the first text may be colored by using the derivative color of the dominant color of the image region, so that after the first text is laid out in the first image, the color of the first text is more coordinated with a background image, and the display is clearer.

In a possible implementation, the method further includes: determining to perform rendering processing on the second image if at least one of the following condition 1 and condition 2 is met: condition 1: a texture feature parameter of an image region that is in the first image and is blocked by the first text when the first text is laid out in the first image based on the second layout format is greater than a fourth threshold, where the texture feature parameter is used to represent a quantity of texture features corresponding to the image region in the image; and condition 2: a proportion of a dominant color of the image region is less than a fifth threshold; and covering the second image with a mask layer; or determining a mask parameter, and processing the second image based on the determined mask parameter; or performing projection rendering on the first text. By performing mask rendering or projection rendering, clarity and saliency of the first text may be improved.

In a possible implementation, the method further includes: determining to perform rendering processing on the third image if at least one of the following condition 1 and condition 2 is met: condition 1: a texture feature parameter of an image region that is in the first image and is blocked by the first text when the first text is laid out in the first image based on the second layout format is greater than a fourth threshold, where the texture feature parameter is used to represent a quantity of texture features corresponding to the image region in the image; and condition 2: a proportion of a dominant color of the image region is less than a fifth threshold; and covering the third image with a mask layer; or determining a mask parameter, and processing the third image based on the determined mask parameter; or performing projection rendering on the first text. By performing mask rendering or projection rendering, clarity and saliency of the first text may be improved.

According to a second aspect, an image-text fusion apparatus is provided, where the apparatus includes: an information obtaining unit, configured to obtain a first image and a first text to be laid out in the first image; an analysis unit, configured to determine a feature value of each pixel in the first image, where a feature value of a pixel is used to represent a probability that a user pays attention to the pixel, and if the feature value of the pixel is greater, the probability that the user pays attention to the pixel is higher; determine a plurality of first layout formats of the first text in the first image based on the first text and the feature value of each pixel in the first image, where when the first text is laid out in the first image based on each first layout format, the first text does not block a pixel whose feature value is greater than a first threshold; and determine a second layout format from the plurality of first layout formats based on cost parameters of the plurality of first layout formats, where a cost parameter of a first layout format is used to represent a magnitude of a feature value of a pixel blocked by the first text when the first text is laid out in the first image based on the first layout format, and a balance degree of feature value distribution of pixels in each region in the first image in which the first text is laid out; and a processing unit, configured to lay out the first text in the first image based on the second layout format to obtain a second image.

The apparatus provided in the second aspect may determine a plurality of candidate text templates and layout positions of a plurality of corresponding texts in an image, so that a text laid out in the image does not block a visually salient object having a greater feature value, such as a human face or a building. Then based on magnitudes of feature values of pixels blocked by the text, a balance degree of feature value distribution of pixels in each region in the image in which the text is laid out, and the like when the text is laid out in the image at corresponding layout positions in the image by using different text templates, a final text template of the text and a layout position of the text in the image are determined, thereby achieving a better layout effect.

In a possible implementation, that the analysis unit determines a feature value of each pixel in the first image includes: the analysis unit determines at least two parameters of a visual saliency parameter, a face feature parameter, an edge feature parameter, and a text feature parameter of each pixel in the first image, where a visual saliency parameter of a pixel is used to represent a probability that the pixel is a pixel corresponding to a visual saliency feature, a face feature parameter of the pixel is used to represent a probability that the pixel is a pixel corresponding to a face, an edge feature parameter of the pixel is used to represent a probability that the pixel is a pixel corresponding to an object contour, and a text feature parameter of the pixel is used to represent a probability that the pixel is a pixel corresponding to a text; and the analysis unit separately performs weighted summation on the determined at least two parameters of the visual saliency parameter, the face feature parameter, the edge feature parameter, and the text feature parameter of each pixel in the first image to determine the feature value of each pixel in the first image. The feature value of each pixel may be determined by comprehensively considering at least two parameters of the visual saliency parameter, the face feature parameter, the edge feature parameter, and the text feature parameter, and a probability that a user pays attention to the feature corresponding to each parameter. Therefore, a probability that the layout position of the text determined based on the feature value does not block a saliency feature is higher.

In a possible implementation, before the analysis unit separately performs weighted summation on the determined at least two parameters of the visual saliency parameter, the face feature parameter, the edge feature parameter, and the text feature parameter of each pixel in the first image to determine the feature value of each pixel in the first image, the analysis unit is further configured to: separately generate at least two feature maps based on the determined at least two parameters of the visual saliency parameter, the face feature parameter, the edge feature parameter, and the text feature parameter of each pixel in the first image, where a pixel value of each pixel in each feature map is a corresponding parameter of the corresponding pixel; and the separately performing weighted summation on the determined at least two parameters of the visual saliency parameter, the face feature parameter, the edge feature parameter, and the text feature parameter of each pixel in the first image to determine the feature value of each pixel in the first image includes: performing weighted summation on pixel values of each pixel in the at least two feature maps to determine the feature value of each pixel in the first image. Weighted summation is performed on at least two of feature maps respectively used to represent the visual saliency parameter, the face feature parameter, the edge feature parameter, and the text feature parameter with reference to a probability that a user pays attention to the feature corresponding to each parameter, to determine the feature value of each pixel. Therefore, a probability that the layout position of the text determined based on the feature value does not block a saliency feature is higher.

In a possible implementation, that the analysis unit determines a plurality of first layout formats of the first text in the first image based on the first text and the feature value of each pixel in the first image includes: the analysis unit determines the plurality of first layout formats based on the feature value of each pixel in the first image and a size of a text box of the first text when the first text is laid out by using one or more text templates. By comprehensively analyzing a size of a region occupied when the first text is laid out by using different text templates and the feature value of each pixel in the first image, it can be ensured that the saliency feature in the first image is not blocked when the first text is laid out at the determined layout position of the text. In a possible implementation, the information obtaining unit is further configured to: obtain the one or more text templates, where each of the text templates specifies at least one of a line spacing, a line width, a font size, a font, a character thickness, an alignment mode, a decorative line position, and a decorative line thickness of a text. The first text may be laid out by using different text templates, so that flexibility is high, and an image-text fusion effect is better.

In a possible implementation, that the analysis unit determines a second layout format from the plurality of first layout formats based on cost parameters of the plurality of first layout formats includes: the analysis unit determines a texture feature parameter of an image region that is in the first image and is blocked by the text box of the first text when the first text is laid out in the first image based on the plurality of first layout formats separately, where the texture feature parameter is used to represent a quantity of texture features corresponding to the image region in the image; the analysis unit selects, from the plurality of first layout formats, a plurality of first layout formats corresponding to image regions whose texture feature parameters are less than a second threshold; and the analysis unit determines the second layout format from the plurality of selected first layout formats based on a cost parameter of each selected first layout format. By discarding a complex texture region as a text layout position, the impact of the texture feature of the region on saliency of the first text can be avoided, and blockage of a texture feature in the region is avoided when the first text is laid out in the region.

In a possible implementation, the analysis unit is further configured to: perform at least two of step a, step b, and step c, and step d for each of the plurality of first layout formats, to obtain a cost parameter of each first layout format: step a: calculating a text intrusion parameter of the first text when the first text is laid out in the first image based on a first layout format, where the text intrusion parameter is a ratio of a first parameter to a second parameter, where the first parameter is a sum of feature values of pixels in an image region blocked by the first text in the first image, and the second parameter is an area of the image region, or the second parameter is a total quantity of pixels in the image region, or the second parameter is a product of a total quantity of pixels in the image region and a preset value; step b: calculating a visual space occupation parameter of the first text when the first text is laid out in the first image based on the first layout format, where the visual space occupation parameter is used to represent a proportion of pixels whose feature values are less than a third threshold in the image region; step c: calculating a visual balance parameter of the first text when the first text is laid out in the first image based on the first layout format, where the visual balance parameter is used to represent a degree of impact of the first text on the balance degree of feature value distribution of pixels in each region in the first image in which the first text is laid out; and step d: calculating a cost parameter of the first layout format based on at least two of the calculated text intrusion parameter, visual space occupation parameter, and visual balance parameter of the first text. By comprehensively considering a specific case of the first text blocking the feature value of the image region when the first text is laid out in different candidate layout formats, and the degree of impact of the first text on the balance degree of feature value distribution of pixels in each region in the first image, a better layout format may be determined from a plurality of candidate layout formats.

In a possible implementation, that the analysis unit calculates a cost parameter of the first layout format based on at least two of the calculated text intrusion parameter, visual space occupation parameter, and visual balance parameter of the first text includes: the analysis unit uses $T_i=\lambda_1*E_s(L_i)+\lambda_2*E_u(L_i)+\lambda_3*E_n(L_i)$, or $T_i=(\lambda_1*E_s(L_i)+\lambda_2*E_u(L_i))*E_n(L_i)$, or $T_i=E_s(L_i)*E_u(L_i)*E_n(L_i)$ to calculate the cost parameter $T_i$ of the first layout format, where $E_s(L_i)$ is the text intrusion parameter of the first text when the first text is laid out in the first image based on the first layout format, $E_u(L_i)$ is the visual space occupation parameter of the first text when the first text is laid out in the first image based on the first layout format, $E_n(L_i)$ is the visual balance parameter of the first text when the first text is laid out in the first image based on the first layout format, and $\lambda_1$, $\lambda_2$, and $\lambda_3$ are weight parameters corresponding to $E_s(L_i)$, $E_u(L_i)$, and $E_n(L_i)$. By using the foregoing calculation method, and comprehensively considering a specific case of the first text blocking the feature value of the image region when the first text is laid out in different candidate layout formats, a cost parameter corresponding to each candidate layout format is calculated.

In a possible implementation, that the analysis unit determines a second layout format from the plurality of first layout formats based on cost parameters of the plurality of first layout formats includes: the analysis unit determines that a first layout format corresponding to a smallest cost parameter among the cost parameters of the plurality of first layout formats is the second layout format. By determining that a candidate layout format corresponding to the minimum value of the cost parameter is a final text layout format, an aesthetic effect obtained after the first text is laid out in the first image can be ensured to a maximum extent.

In a possible implementation, the processing unit is further configured to: determine a color parameter of the first text, where the color parameter of the first text is a derivative color of a dominant color of an image region blocked by the first text in the first image when the first text is laid out in the first image based on the second layout format, and the derivative color of the dominant color is a color having a same hue as the dominant color but having a tone, saturation, and brightness different from an HSV of the dominant color; and color the first text in the second image based on the color parameter of the first text to obtain a third image. The first text is colored by using the derivative color of the dominant color of the image region that may be blocked by the first text in the first image, so that after the first text is laid out in the first image, the color of the first text is more coordinated with a background image, and the display is clearer.

In a possible implementation, the dominant color of the image region blocked by the first text in the first image is determined based on tones, saturation, and brightness of three primary colors RGB of the image region blocked by the first text in the first image in an HSV space when the first text is laid out in the first image based on the second layout format; and the dominant color is a hue with a highest hue proportion in the image region. The dominant color of the image region is determined based on tones, saturation, and brightness of the image region that may be blocked by the first text in the first image, and further the first text may be colored by using the derivative color of the dominant color of the image region, so that after the first text is laid out in the first image, the color of the first text is more coordinated with a background image, and the display is clearer.

In a possible implementation, the analysis unit is further configured to: determine to perform rendering processing on the second image if at least one of the following condition 1 and condition 2 is met: condition 1: a texture feature parameter of an image region that is in the first image and is blocked by the first text when the first text is laid out in the first image based on the second layout format is greater than a fourth threshold, where the texture feature parameter is used to represent a quantity of texture features corresponding to the image region in the image; and condition 2: a proportion of a dominant color of the image region is less than a fifth threshold; and the processing unit is further configured to: cover the second image with a mask layer; or determine a mask parameter, and process the second image based on the determined mask parameter; or perform projection rendering on the first text. By performing mask rendering or projection rendering, clarity and saliency of the first text may be improved.

In a possible implementation, the analysis unit is further configured to: determine to perform rendering processing on the third image if at least one of the following condition 1 and condition 2 is met: condition 1: a texture feature parameter of an image region that is in the first image and is blocked by the first text when the first text is laid out in the first image based on the second layout format is greater than a fourth threshold, where the texture feature parameter is used to represent a quantity of texture features corresponding to the image region in the image; and condition 2: a proportion of a dominant color of the image region is less than a fifth threshold; and the processing unit is further configured to: cover the third image with a mask layer; or determine a mask parameter, and process the third image based on the determined mask parameter; or perform projection rendering on the first text. By performing mask rendering or projection rendering, clarity and saliency of the first text may be improved.

According to a third aspect, an electronic device is provided, where the electronic device includes: an information obtaining unit, configured to obtain a first image and a first text to be laid out in the first image; an analysis unit, configured to determine a feature value of each pixel in the first image, where a feature value of a pixel is used to represent a probability that a user pays attention to the pixel, and if the feature value of the pixel is greater, the probability that the user pays attention to the pixel is higher; determine a plurality of first layout formats of the first text in the first image based on the first text and the feature value of each pixel in the first image, where when the first text is laid out in the first image based on each first layout format, the first text does not block a pixel whose feature value is greater than a first threshold; and determine a second layout format from the plurality of first layout formats based on cost parameters of the plurality of first layout formats, where a cost parameter of a first layout format is used to represent a magnitude of a feature value of a pixel blocked by the first text when the first text is laid out in the first image based on the first layout format, and a balance degree of feature value distribution of pixels in each region in the first image in which the first text is laid out; and a processing unit, configured to lay out the first text in the first image based on the second layout format to obtain a second image.

The electronic device provided in the third aspect may determine a plurality of candidate text templates and layout positions of a plurality of corresponding texts in an image, so that a text laid out in the image does not block a visually salient object having a greater feature value, such as a human face or a building. Then based on magnitudes of feature values of pixels blocked by the text, a balance degree of feature value distribution of pixels in each region in the image in which the text is laid out, and the like when the text is laid out in the image at corresponding layout positions in the image by using different text templates, a final text template of the text and a layout position of the text in the image are determined, thereby achieving a better layout effect.

In a possible implementation, that the analysis unit determines a feature value of each pixel in the first image includes: the analysis unit determines at least two parameters of a visual saliency parameter, a face feature parameter, an edge feature parameter, and a text feature parameter of each pixel in the first image, where a visual saliency parameter of a pixel is used to represent a probability that the pixel is a pixel corresponding to a visual saliency feature, a face feature parameter of the pixel is used to represent a probability that the pixel is a pixel corresponding to a face, an edge feature parameter of the pixel is used to represent a probability that the pixel is a pixel corresponding to an object contour, and a text feature parameter of the pixel is used to represent a probability that the pixel is a pixel corresponding to a text; and the analysis unit separately performs weighted summation on the determined at least two parameters of the visual saliency parameter, the face feature parameter, the edge feature parameter, and the text feature parameter of each pixel in the first image to determine the feature value of each pixel in the first image. The feature value of each pixel may be determined by comprehensively considering at least two parameters of the visual saliency parameter, the face feature parameter, the edge feature parameter, and the text feature parameter, and a probability that a user pays attention to the feature corresponding to each parameter. Therefore, a probability that the layout position of the text determined based on the feature value does not block a saliency feature is higher.

In a possible implementation, before the analysis unit separately performs weighted summation on the determined at least two parameters of the visual saliency parameter, the face feature parameter, the edge feature parameter, and the text feature parameter of each pixel in the first image to determine the feature value of each pixel in the first image, the analysis unit is further configured to: separately generate at least two feature maps based on the determined at least two parameters of the visual saliency parameter, the face feature parameter, the edge feature parameter, and the text feature parameter of each pixel in the first image, where a pixel value of each pixel in each feature map is a corresponding parameter of the corresponding pixel; and the separately performing weighted summation on the determined at least two parameters of the visual saliency parameter, the face feature parameter, the edge feature parameter, and the text feature parameter of each pixel in the first image to determine the feature value of each pixel in the first image includes: performing weighted summation on pixel values of each pixel in the at least two feature maps to determine the feature value of each pixel in the first image. Weighted summation is performed on at least two of feature maps respectively used to represent the visual saliency parameter, the face feature parameter, the edge feature parameter, and the text feature parameter with reference to a probability that a user pays attention to the feature corresponding to each parameter, to determine the feature value of each pixel. Therefore, a probability that the layout position of the text determined based on the feature value does not block a saliency feature is higher.

In a possible implementation, that the analysis unit determines a plurality of first layout formats of the first text in the first image based on the first text and the feature value of each pixel in the first image includes: the analysis unit determines the plurality of first layout formats based on the feature value of each pixel in the first image and a size of a text box of the first text when the first text is laid out by using one or more text templates. By comprehensively analyzing a size of a region occupied when the first text is laid out by using different text templates and the feature value of each pixel in the first image, it can be ensured that the saliency feature in the first image is not blocked when the first text is laid out at the determined layout position of the text.

In a possible implementation, the information obtaining unit is further configured to: obtain the one or more text templates, where each of the text templates specifies at least one of a line spacing, a line width, a font size, a font, a character thickness, an alignment mode, a decorative line position, and a decorative line thickness of a text. The first text may be laid out by using different text templates, so that flexibility is high, and an image-text fusion effect is better.

In a possible implementation, that the analysis unit determines a second layout format from the plurality of first layout formats based on cost parameters of the plurality of first layout formats includes: the analysis unit determines a texture feature parameter of an image region that is in the first image and is blocked by the text box of the first text when the first text is laid out in the first image based on the plurality of first layout formats separately, where the texture feature parameter is used to represent a quantity of texture features corresponding to the image region in the image; the analysis unit selects, from the plurality of first layout formats, a plurality of first layout formats corresponding to image regions whose texture feature parameters are less than a second threshold; and the analysis unit determines the second layout format from the plurality of selected first layout formats based on a cost parameter of each selected first layout format. By discarding a complex texture region as a text layout position, the impact of the texture feature of the region on saliency of the first text can be avoided, and blockage of a texture feature in the region is avoided when the first text is laid out in the region.

In a possible implementation, the analysis unit is further configured to: perform at least two of step a, step b, and step c, and step d for each of the plurality of first layout formats, to obtain a cost parameter of each first layout format: step a: calculating a text intrusion parameter of the first text when the first text is laid out in the first image based on a first layout format, where the text intrusion parameter is a ratio of a first parameter to a second parameter, where the first parameter is a sum of feature values of pixels in an image region blocked by the first text in the first image, and the second parameter is an area of the image region, or the second parameter is a total quantity of pixels in the image region, or the second parameter is a product of a total quantity of pixels in the image region and a preset value; step b: calculating a visual space occupation parameter of the first text when the first text is laid out in the first image based on the first layout format, where the visual space occupation parameter is used to represent a proportion of pixels whose feature values are less than a third threshold in the image region; step c: calculating a visual balance parameter of the first text when the first text is laid out in the first image based on the first layout format, where the visual balance parameter is used to represent a degree of impact of the first text on the balance degree of feature value distribution of pixels in each region in the first image in which the first text is laid out; and step d: calculating a cost parameter of the first layout format based on at least two of the calculated text intrusion parameter, visual space occupation parameter, and visual balance parameter of the first text. By comprehensively considering a specific case of the first text blocking the feature value of the image region when the first text is laid out in different candidate layout formats, and the degree of impact of the first text on the balance degree of feature value distribution of pixels in each region in the first image, a better layout format may be determined from a plurality of candidate layout formats.

In a possible implementation, that the analysis unit calculates a cost parameter of the first layout format based on at least two of the calculated text intrusion parameter, visual space occupation parameter, and visual balance parameter of the first text includes: the analysis unit uses $T_i=\lambda_1*E_s(L_i)+\lambda_2*E_u(L_i)+\lambda_3*E_n(L_i)$, or $T_i=(\lambda_1*E_s(L_i)+\lambda_2*E_u(L_i))*E_n(L_i)$, or $T_i=E_s(L_i)*E_u(L_i)*E_n(L_i)$ to calculate the cost parameter $T_i$ of the first layout format, where $E_s(L_i)$ is the text intrusion parameter of the first text when the first text is laid out in the first image based on the first layout format, $E_u(L_i)$ is the visual space occupation parameter of the first text when the first text is laid out in the first image based on the first layout format, $E_n(L_i)$ is the visual balance parameter of the first text when the first text is laid out in the first image based on the first layout format, and $\lambda_1$, $\lambda_2$, and $\lambda_3$ are weight parameters corresponding to $E_s(L_i)$, $E_u(L_i)$, and $E_n(L_i)$. By using the foregoing calculation method, and comprehensively considering a specific case of the first text blocking the feature value of the image region when the first text is laid out in different candidate layout formats, a cost parameter corresponding to each candidate layout format is calculated.

In a possible implementation, that the analysis unit determines a second layout format from the plurality of first layout formats based on cost parameters of the plurality of first layout formats includes: the analysis unit determines that a first layout format corresponding to a smallest cost parameter among the cost parameters of the plurality of first layout formats is the second layout format. By determining that a candidate layout format corresponding to the minimum value of the cost parameter is a final text layout format, an aesthetic effect obtained after the first text is laid out in the first image can be ensured to a maximum extent.

In a possible implementation, the processing unit is further configured to: determine a color parameter of the first text, where the color parameter of the first text is a derivative color of a dominant color of an image region blocked by the first text in the first image when the first text is laid out in the first image based on the second layout format, and the derivative color of the dominant color is a color having a same hue as the dominant color but having a tone, saturation, and brightness different from an HSV of the dominant color; and color the first text in the second image based on the color parameter of the first text to obtain a third image. The first text is colored by using the derivative color of the dominant color of the image region that may be blocked by the first text in the first image, so that after the first text is laid out in the first image, the color of the first text is more coordinated with a background image, and the display is clearer.

In a possible implementation, the dominant color of the image region blocked by the first text in the first image is determined based on tones, saturation, and brightness of three primary colors RGB of the image region blocked by the first text in the first image in an HSV space when the first text is laid out in the first image based on the second layout format; and the dominant color is a hue with a highest hue proportion in the image region. The dominant color of the image region is determined based on tones, saturation, and brightness of the image region that may be blocked by the first text in the first image, and further the first text may be colored by using the derivative color of the dominant color of the image region, so that after the first text is laid out in the first image, the color of the first text is more coordinated with a background image, and the display is clearer.

In a possible implementation, the analysis unit is further configured to: determine to perform rendering processing on the second image if at least one of the following condition 1 and condition 2 is met: condition 1: a texture feature parameter of an image region that is in the first image and is blocked by the first text when the first text is laid out in the first image based on the second layout format is greater than a fourth threshold, where the texture feature parameter is used to represent a quantity of texture features corresponding to the image region in the image; and condition 2: a proportion of a dominant color of the image region is less than a fifth threshold; and the processing unit is further configured to: cover the second image with a mask layer; or determine a mask parameter, and process the second image based on the determined mask parameter; or perform projection rendering on the first text. By performing mask rendering or projection rendering, clarity and saliency of the first text may be improved.

In a possible implementation, the analysis unit is further configured to: determine to perform rendering processing on the third image if at least one of the following condition 1 and condition 2 is met: condition 1: a texture feature parameter of an image region that is in the first image and is blocked by the first text when the first text is laid out in the first image based on the second layout format is greater than a fourth threshold, where the texture feature parameter is used to represent a quantity of texture features corresponding to the image region in the image; and condition 2: a proportion of a dominant color of the image region is less than a fifth threshold; and the processing unit is further configured to: cover the third image with a mask layer; or determine a mask parameter, and process the third image based on the determined mask parameter; or perform projection rendering on the first text. By performing mask rendering or projection rendering, clarity and saliency of the first text may be improved.

According to a fourth aspect, an image-text fusion apparatus is provided, where the apparatus includes a memory, configured to store one or more computer programs; and a processor, configured to execute the one or more computer programs stored in the memory, so that the image-text fusion apparatus implements the image-text fusion method according to any possible implementation of the first aspect.

According to a fifth aspect, an electronic device is provided, where the electronic device includes a memory, configured to store one or more computer programs; and a processor, configured to execute the one or more computer programs stored in the memory, so that the image-text fusion apparatus implements the image-text fusion method according to any possible implementation of the first aspect.

According to a sixth aspect, a computer-readable storage medium is provided, where the computer-readable storage medium stores computer-executable instructions, and when the computer-executable instructions are executed by a processor, the image-text fusion method according to any possible implementation of the first aspect is implemented.

According to a seventh aspect, a system-on-chip is provided, where the system-on-chip includes a processor and a memory, the memory stores instructions, and when the instructions are executed by the processor, the image-text fusion method according to any possible implementation of the first aspect is implemented. The system-on-chip may include a chip or may include a chip and another discrete device.

According to an eighth aspect, a computer program product is provided, where when the computer program product runs on a computer, the image-text fusion method according to any possible implementation of the first aspect is implemented. For example, the computer may be at least one storage node.

BRIEF DESCRIPTION OF DRAWINGS

FIG. 4(a), FIG. 4(b), and FIG. 4(c) are examples of a scenario of image-text fusion according to an embodiment;

FIG. 8(a) to FIG. 8(f) are example diagrams of a process of generating a salient region feature map according to an embodiment;

FIG. 9(a) to FIG. 9(f) are example diagrams of another process of generating a salient region feature map according to an embodiment of this application;

FIG. 14 is an example diagram of a layout specification of a JSON format according to an embodiment;

FIG. 16(a), FIG. 16(b), and FIG. 16(c) are example diagrams of several text templates according to an embodiment;

FIG. 17(a), FIG. 17(b), and FIG. 17(c) are example diagrams of several candidate layout formats according to an embodiment;

DETAILED DESCRIPTION OF THE EMBODIMENTS

Figure 1:
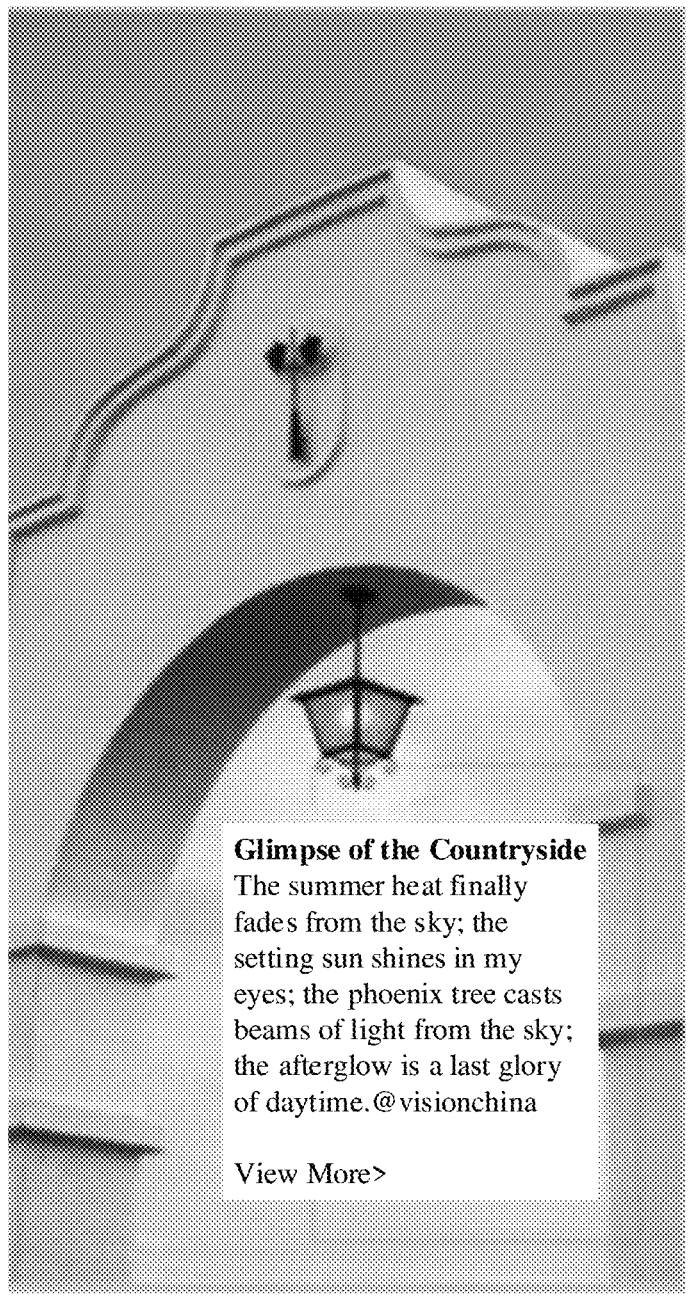
FIG. 1 is an example diagram of image-text fusion according to an embodiment.

An embodiment provides an image-text fusion method. The method may be applied to a process of laying out a text in an image (for example, a first image), to implement image-text fusion. After the text is laid out in the image, the text may block some regions in the image. After the text is laid out in the image by using the method in this embodiment, the text laid out in the image does not block a saliency feature in the image. For example, as shown in FIG. 1, the first image is an image including a building feature, and the text to be laid out in the first image is mainly a text entitled "Glimpse of the Countryside". By using the image-text fusion method in this embodiment, the text entitled "Glimpse of the Countryside" may be laid out in an appropriate position in the first image including the building feature. In this way, blockage of the saliency feature by the text in the image is minimized, and further, after the text is laid out in the first image, a higher visual balance degree is obtained.

The saliency feature is an image feature with a relatively high probability of attracting attention of a user. For example, saliency features may include a face feature, a human body feature, a building feature, features of things, (for example, an animal feature, a tree feature, and a flower feature), a character feature, a river feature, and a mountain feature. As shown in FIG. 1, the saliency feature is a building feature.

It should be noted that the image-text fusion method in this embodiment may be applied to a terminal-type electronic device capable of displaying an image. The device includes a desktop device, a laptop device, a handheld device, a wearable device, or the like. For example, the method is applied to a mobile phone, a tablet computer, a personal computer, a smart camera, a netbook, a personal digital assistant (PDA), a smartwatch, or an AR (augmented reality) or VR (virtual reality) device.

Alternatively, the image-text fusion method in this embodiment may be further applied to an image processing apparatus or a server-type electronic device (for example, an application server) that has or does not have an image display function. A specific type, structure, or the like of the electronic device that performs the image-text fusion method in this embodiment is not limited in this embodiment.

Figure 2:
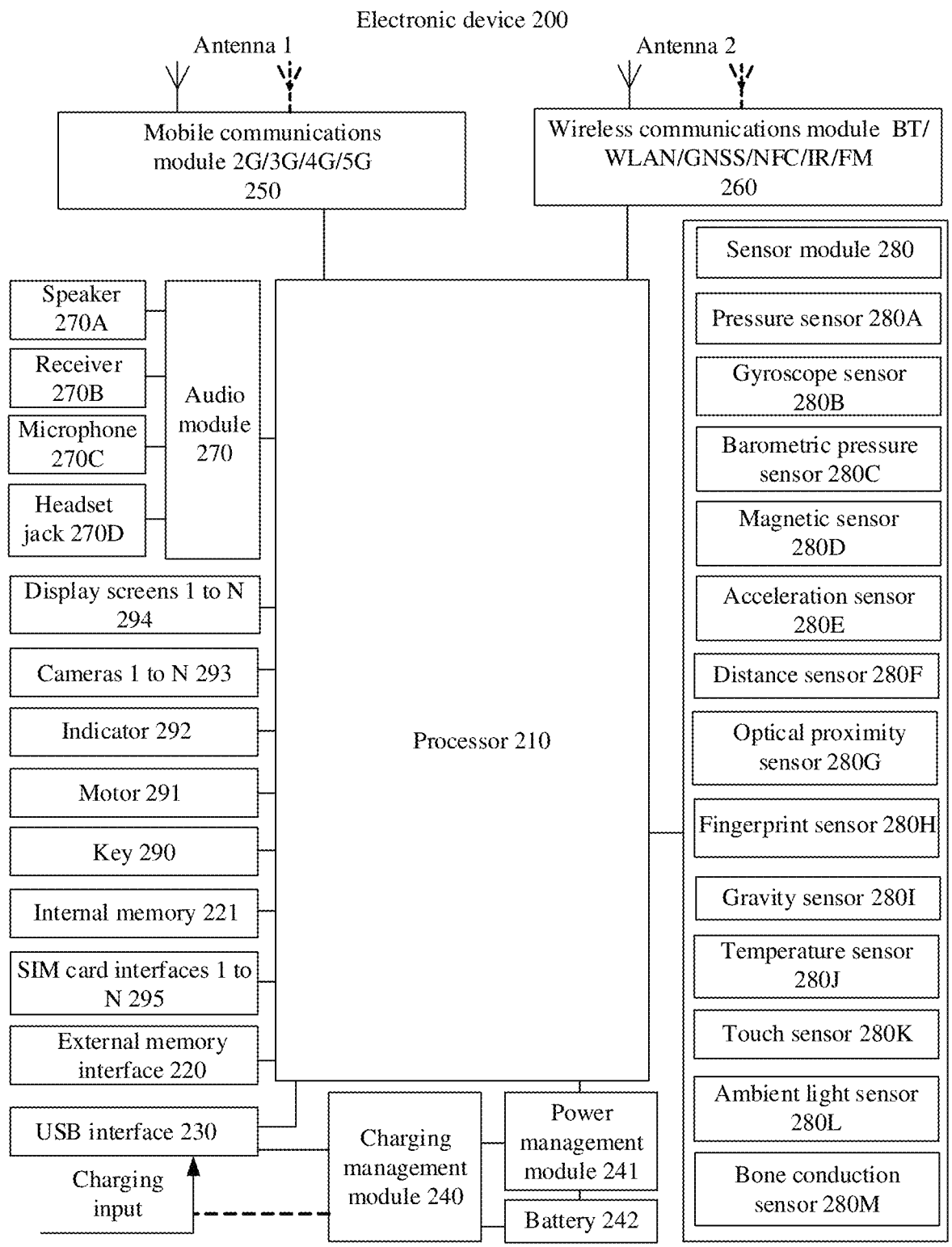
FIG. 2 is a schematic diagram of a hardware structure of an electronic device according to an embodiment.

FIG. 2 is a schematic diagram of a hardware structure of a terminal-type electronic device 200 according to an embodiment. As shown in FIG. 2, the electronic device 200 may include a processor 210, a memory (including an external memory interface 220 and an internal memory 221), a universal serial bus (USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a key 290, a motor 291, an indicator 292, a camera 293, a display screen 294, and a subscriber identity module (SIM) card interface 295, and the like. The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a gravity sensor 280I, a temperature sensor 280J, a touch sensor 280K, an ambient light sensor 280L, a bone conduction sensor 280M, and the like.

The structure shown in this embodiment does not constitute a limitation on the electronic device 200. In some other embodiments, the electronic device 200 may include more or fewer components than those shown in the figure, or combine some components, or split some components, or have different component arrangements. The components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components or may be integrated into one or more processors.

The controller may generate an operation control signal based on instruction operation code and a time sequence signal, to complete control of instruction reading and instruction execution.

A memory may be further disposed in the processor 210 and is configured to store instructions and data. In some embodiments, the memory in the processor 210 is a cache. The memory may store instructions or data that has just been used or recycled by the processor 210. If the processor 210 needs to use the instruction or the data again, the processor 210 may directly invoke the instruction or the data from the memory. This avoids repeated access and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus and includes a serial data line (SDA) and a serial clock line (SCL). In some embodiments, the processor 210 may include a plurality of groups of I2C buses. The processor 210 may be separately coupled to the touch sensor 280K, a charger, a flash, the camera 293, and the like by using different I2C bus interfaces. For example, the processor 210 may be coupled to the touch sensor 280K by using the I2C interface, so that the processor 210 communicates with the touch sensor 280K by using the I2C bus interface, to implement a touch function of the electronic device 200.

The MIPI interface may be configured to connect the processor 210 and a peripheral component such as the display 294 or the camera 293. The MIPI interface includes a camera serial interface (CSI), a display serial interface (DSI), and the like. In some embodiments, the processor 210 communicates with the camera 293 by using the CSI interface, to implement a photographing function of the electronic device 200. The processor 210 communicates with the display 294 by using the DSI interface, to implement a display function of the electronic device 200.

The GPIO interface may be configured by using software. The GPIO interface may be configured as a control signal or a data signal. In some embodiments, the GPIO interface may be configured to connect the processor 210 to the camera 293, the display 294, the wireless communications module 260, the audio module 270, the sensor module 280, or the like. The GPIO interface may alternatively be configured as an I2C interface, an I2S interface, a UART interface, an MIPI interface, or the like.

The USB interface 230 is an interface that conforms to a USB standard specification, and may be a mini USB interface, a micro USB interface, a USB Type-C interface, or the like. The USB interface 230 may be configured to connect to the charger to charge the electronic device 200 or may be configured to perform data transmission between the electronic device 200 and a peripheral device or may be configured to connect to a headset for playing audio through the headset. Alternatively, the port may be used to connect to another electronic device, for example, an AR device.

An interface connection relationship between the modules that is shown in this embodiment is merely an example for description and does not constitute a limitation on the structure of the electronic device 200. In some other embodiments, the electronic device 200 may alternatively use an interface connection manner different from an interface connection manner in this embodiment, or a combination of a plurality of interface connection manners.

The charging management module 240 is configured to receive a charging input from a charger. The charger may be a wireless charger or a wired charger. In some embodiments of wired charging, the charging management module 240 may receive a charging input of the wired charger by using the USB interface 230. In some embodiments of wireless charging, the charging management module 240 may receive a wireless charging input by using a wireless charging coil of the electronic device 200. When charging the battery 242, the charging management module 240 may further supply power to the electronic device 200 by using the power management module 241.

The power management module 241 is configured to connect to the battery 242, the charging management module 240, and the processor 210. The power management module 241 receives input of the battery 242 and/or the charging management module 240, and supplies power to the processor 210, the internal memory 221, the display 294, the camera 293, the wireless communications module 260, and the like. The power management module 241 may be further configured to monitor parameters such as a battery capacity, a battery cycle count, and a battery health status (an electric leakage or impedance). In some other embodiments, the power management module 241 may alternatively be disposed in the processor 210. In some other embodiments, the power management module 241 and the charging management module 240 may alternatively be disposed in a same device.

A wireless communication function of the electronic device 200 may be implemented through the antenna 1, the antenna 2, the mobile communications module 250, the wireless communications module 260, the modem processor, the baseband processor, and the like.

The antenna 1 and the antenna 2 are configured to: transmit and receive electromagnetic wave signals. Each antenna in the electronic device 200 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 250 can provide a solution, applied to the electronic device 200, to wireless communication including 2G, 3G, 4G, 5G, or the like. The mobile communications module 250 may include at least one filter, a switch, a power amplifier, a low noise amplifier (LNA), and the like. The mobile communications module 250 may receive an electromagnetic wave by using the antenna 1, perform processing such as filtering and amplification on the received electromagnetic wave, and transmit the electromagnetic wave to the modem processor for demodulation. The mobile communications module 250 may further amplify a signal modulated by the modem processor and convert the signal into an electromagnetic wave by using the antenna 1 for radiation. In some embodiments, at least some function modules of the mobile communications module 250 may be disposed in the processor 210. In some embodiments, at least some function modules of the mobile communications module 250 and at least some modules of the processor 210 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then a processed low-frequency baseband signal is transferred to the application processor. The application processor outputs a sound signal by using an audio device (not limited to the speaker 270A, the receiver 270B, or the like), or displays an image or a video by using the display 294. In some embodiments, the modem processor may be an independent device. In some other embodiments, the modem processor may be independent of the processor 210 and disposed in a same device as the mobile communications module 250 or another function module.

The wireless communications module 260 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 200. The wireless communications module 260 may be one or more devices integrating at least one communication processing module. The wireless communications module 260 receives an electromagnetic wave by using the antenna 2, performs frequency modulation and filtering on the electromagnetic wave signal, and sends the processed signal to the processor 210. The wireless communications module 260 may further receive a to-be-sent signal from the processor 210, perform frequency modulation and amplification on the to-be-sent signal, and convert the signal into an electromagnetic wave by using the antenna 2 for radiation.

In some embodiments, the antenna 1 of the electronic device 200 is coupled to the mobile communications module 250, and the antenna 2 is coupled to the wireless communications module 260, so that the electronic device 200 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 200 implements a display function by using the GPU, the display 294, the application processor, and the like. The GPU is a microprocessor for image processing and is connected to the display 294 and the application processor. The GPU is configured to: perform mathematical and geometric calculation and render an image. The processor 210 may include one or more GPUs that execute program instructions to generate or change display information. In this embodiment, the electronic device 200 may complete image-text fusion by using the GPU and may display an image-text fused image by using the display screen 294.

The display 294 is configured to display an image, a video, and the like. The display 294 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the electronic device 200 may include one or N displays 294, where N is a positive integer greater than 1.

The electronic device 200 can implement a shooting function by using the ISP, the camera 293, the video codec, the GPU, the display 294, the application processor, and the like.

The ISP is configured to process data fed back by the camera 293. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a shooting scenario. In some embodiments, the ISP may be disposed in the camera 293.

The camera 293 is configured to capture a still image or a video. An optical image of an object is generated through the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 200 may include one or N cameras 293, where N is a positive integer greater than 1.

The digital signal processor is configured to process a digital signal and may process another digital signal in addition to the digital image signal. For example, when the electronic device 200 selects a frequency, the digital signal processor is configured to perform Fourier transform on frequency energy and the like.

The video codec is configured to compress or decompress a digital video. The electronic device 200 may support one or more video codecs. In this way, the electronic device 200 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons and may further continuously perform self-learning. The NPU can implement applications such as intelligent cognition of the electronic device 200, such as image recognition, facial recognition, speech recognition, and text understanding.

The external memory interface 220 may be configured to connect to an external storage card, for example, a micro SD card, to extend a storage capability of the electronic device 200. The external memory card communicates with the processor 210 by using the external memory interface 220, to implement a data storage function. For example, files such as music and videos are stored in the external storage card.

The internal memory 221 may be configured to store computer-executable program code, where the executable program code includes instructions. The internal memory 221 may include a program storage area and a data storage area. The program storage area may store an operating system, an application required by at least one function (for example, a sound playing function or an image playing function), and the like. The data storage area may store data (such as audio data and a phone book) created when the electronic device 200 is used, and the like. In addition, the internal memory 221 may include a high-speed random access memory, and may further include a nonvolatile memory, for example, at least one magnetic disk storage device, a flash memory device, or a universal flash storage (UFS). The processor 210 runs the instruction stored in the internal memory 221 and/or the instruction stored in the memory disposed in the processor, to perform various function applications of the terminal device 200 and data processing.

The electronic device 200 can implement an audio function, for example, music playing or recording, by using the audio module 270, the speaker 270A, the receiver 270B, the microphone 170C, the headset jack 170D, the application processor, and the like.

The audio module 270 is configured to convert digital audio information into an analog audio signal for output and is also configured to convert analog audio input into a digital audio signal. The audio module 270 may be further configured to: code and decode an audio signal. In some embodiments, the audio module 270 may be disposed in the processor 210, or some function modules in the audio module 270 are disposed in the processor 210.

The speaker 270A, also referred to as a "horn", is configured to convert an audio electrical signal into a sound signal. The electronic device 200 may listen to music or answer a hands-free call by using the speaker 270A.

The receiver 270B, also referred to as an "earpiece", is configured to convert an audio electrical signal into a sound signal. When the electronic device 200 answers a call or receives voice information, the receiver 270B may be placed close to a human ear to listen to a voice.

The microphone 270C, also referred to as a "mike" or a "microphone", is configured to convert a sound signal into an electrical signal. When making a call or sending voice information, a user may make a sound by moving a human mouth close to the microphone 270C to input a sound signal to the microphone 270C. At least one microphone 270C may be disposed in the electronic device 200. In some other embodiments, two microphones 270C may be disposed in the electronic device 200, to collect a sound signal and further implement a noise reduction function. In some other embodiments, three, four, or more microphones 270C may alternatively be disposed in the electronic device 200, to collect a sound signal, reduce noise, identify a sound source, implement a directional recording function, and the like.

The headset jack 270D is configured to connect to a wired headset. The headset jack 270D may be the USB interface 230 or may be a 3.5 mm open mobile electronic device platform (OMTP) standard interface or a cellular telecommunications industry association of the USA (CTIA) standard interface.

The pressure sensor 280A is configured to sense a pressure signal and may convert the pressure signal into an electrical signal. In some embodiments, the pressure sensor 280A may be disposed on the display 294. There are many types of pressure sensors 280A such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 280A. The electronic device 200 determines pressure intensity based on the change of the capacitance. When a touch operation is performed on the display 294, the electronic device 200 detects intensity of the touch operation based on the pressure sensor 280A. The electronic device 200 may also calculate a touch location based on a detection signal of the pressure sensor 280A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The key 290 includes a power key, a volume key, or the like. The button 290 may be a mechanical button or may be a touch button. The electronic device 200 may receive a button input and generate a button signal input related to a user setting and function control of the electronic device 200.

The motor 291 may generate a vibration prompt. The motor 291 may be used for an incoming call vibration prompt or may be used for touch vibration feedback. For example, touch operations performed on different applications (for example, photographing and audio playing) may correspond to different vibration feedback effects. The motor 291 may also generate different vibration feedback effects for touch operations performed on different areas of the display 294. Different application scenarios (for example, a time reminder scenario, an information receiving scenario, an alarm clock scenario, and a game scenario) may also correspond to different vibration feedback effects. A touch vibration feedback effect may be further customized.

The indicator 292 may be an indicator light and may be configured to indicate a charging status and a battery level change, or may be configured to indicate a message, a missed call, a notification, and the like.

The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or of different types. The SIM card interface 295 may also be compatible with different types of SIM cards. The SIM card interface 295 may also be compatible with the external storage card. The electronic device 200 interacts with a network by using the SIM card, to implement a call function, a data communication function, and the like. In some embodiments, the electronic device 200 uses an eSIM, namely, an embedded SIM card. The eSIM card may be embedded into the electronic device 200 and cannot be separated from the electronic device 200.

Each image-text fusion method in the embodiments may be implemented in an electronic device 200 having the foregoing hardware structure or an electronic device 200 having a similar structure. For example, the electronic device 200 may be a mobile phone, a tablet computer, a personal computer, or a netbook.

In the embodiments, after the electronic device 200 lays out a text in a first image, an image-text fused image (for example, a second image or a third image) is obtained, and the fused image may be directly displayed on the display screen of the electronic device 200, or may be used for another purpose. Similarly, if the image-text fusion method is applied to another type of electronic device, for example, a server-type electronic device, an image-text fused image obtained by the server-type electronic device may be pushed to a display screen of a terminal-type electronic device for displaying or may be used for another purpose.

Refer to the following examples. The following several examples are examples of several possible scenarios of image-text fused images obtained in the embodiments.

Figure 3A:
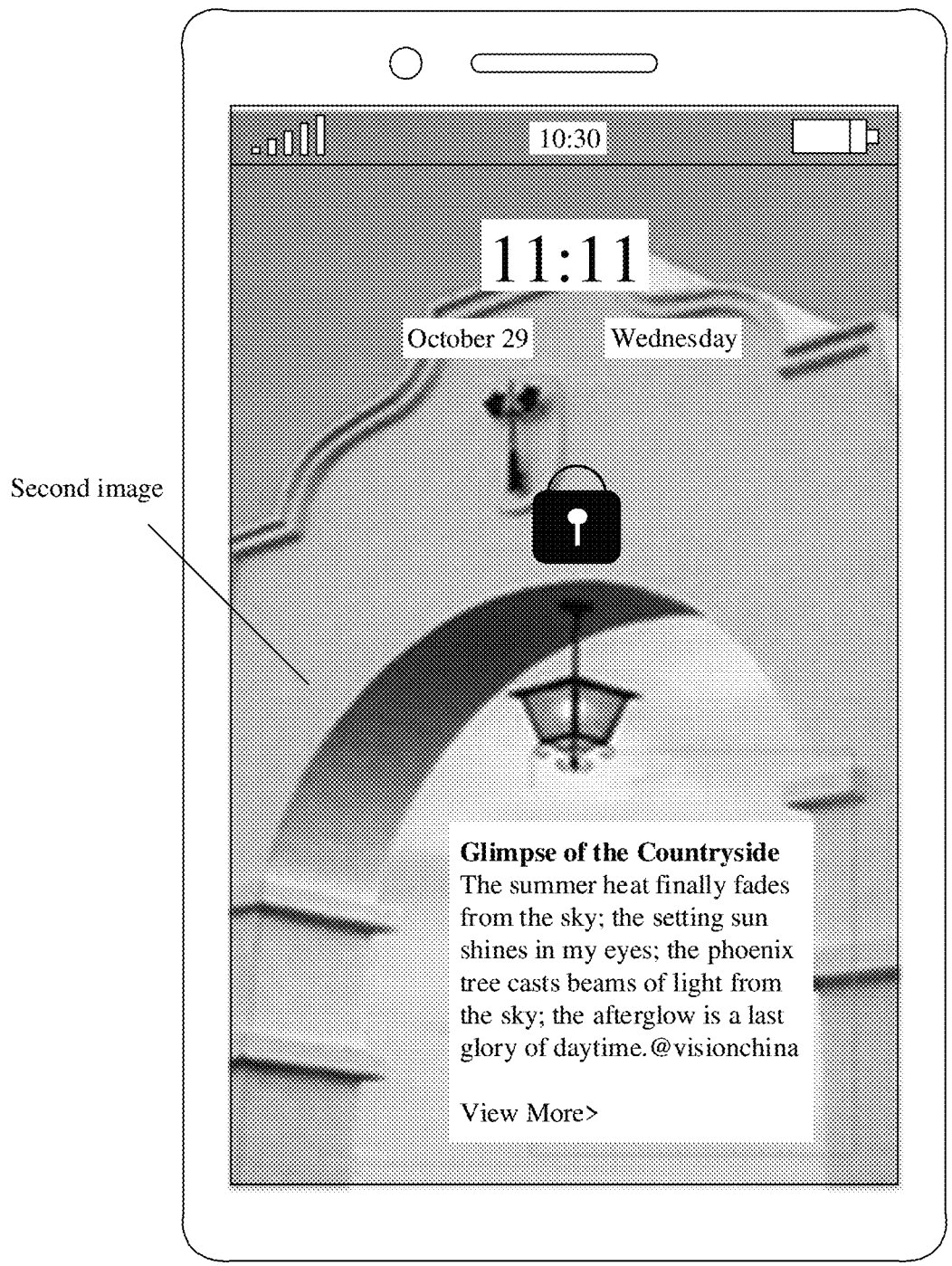
FIG. 3(a), FIG. 3(b), and FIG. 3(c) are examples of a scenario of image-text fusion according to an embodiment.
Figure 3B:
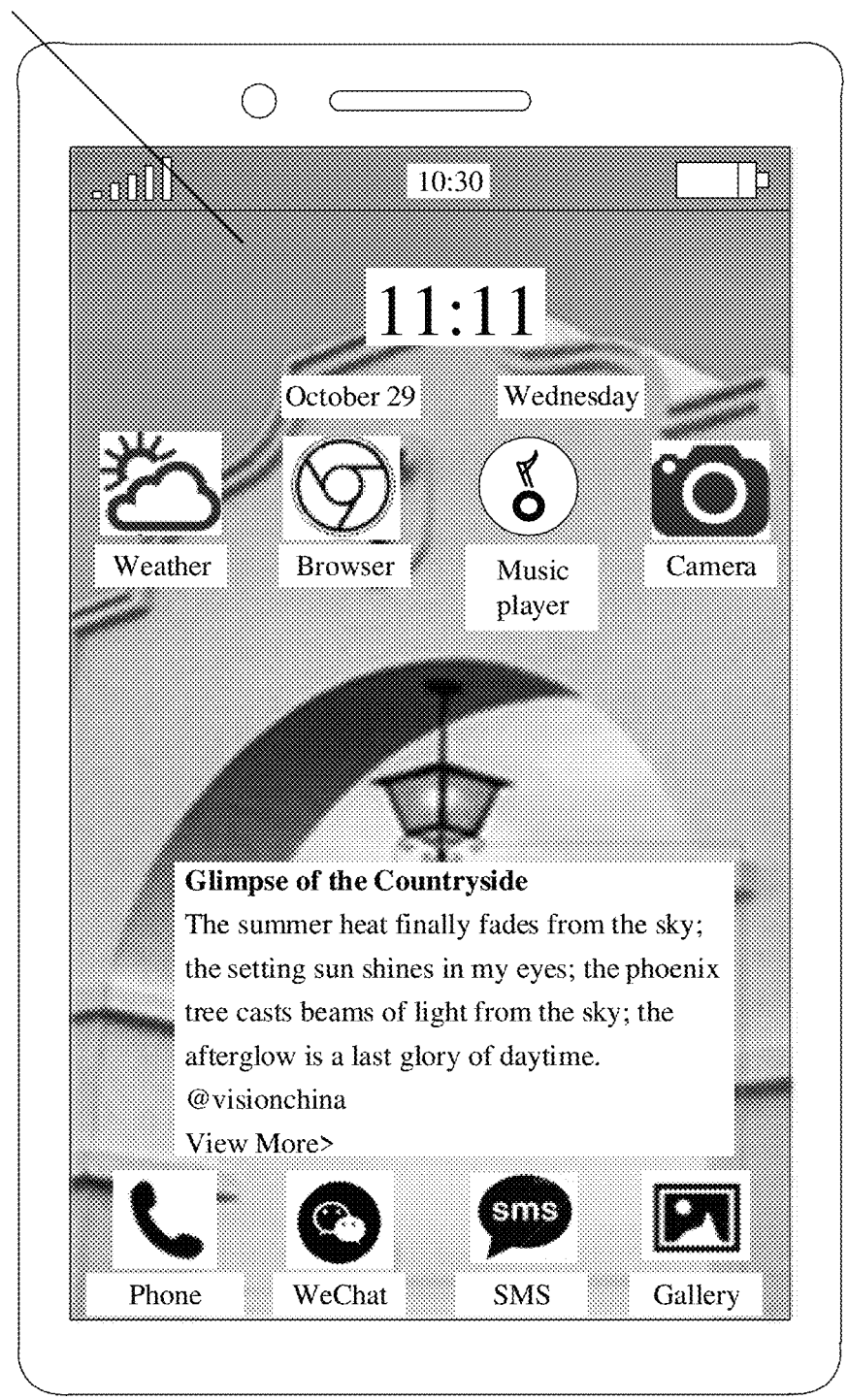
Figure 3C:
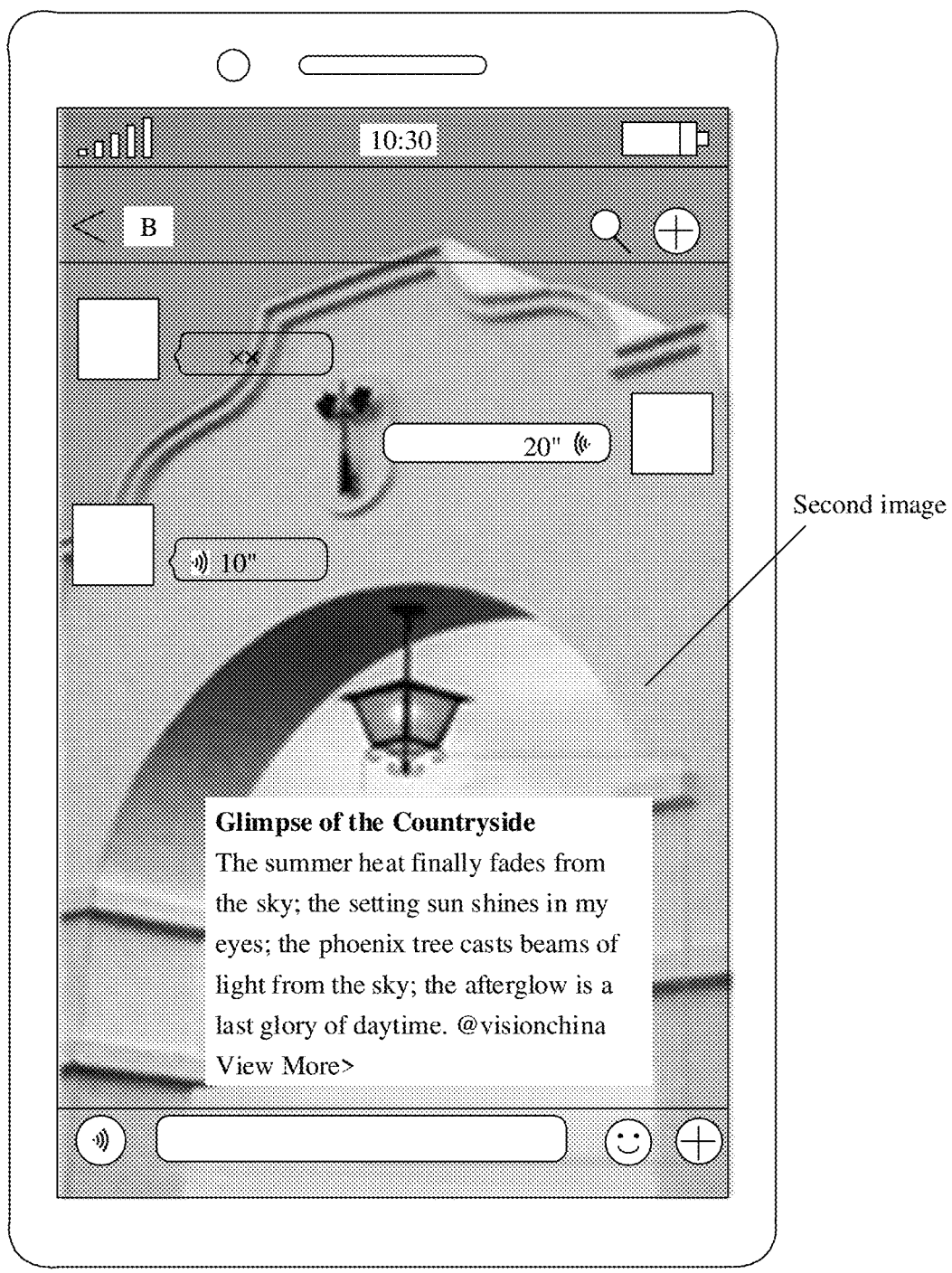

Example 1: An Image-Text Fused Image is Used as a Wallpaper of the Electronic Device, for Example, a Lock Screen Wallpaper, a Main Interface Wallpaper, or a Chat Interface Background FIG. 3(c) shows an example in which an image-text fused image is used as a lock screen wallpaper of a mobile phone. FIG. 3(b) shows an example in which an image-text fused image is used as a main interface wallpaper of a mobile phone. FIG. 3(c) shows an example in which an image-text fused image is used as a background of a WeChat chat interface of a mobile phone.

Example 2: An Image-Text Fused Image is Used as a Launch Page or a Guide Page of an Application, for Example, an Interface when the Application is Started The launch page may also be referred to as a splash page. Design of the launch page can effectively use a blank interface during initialization of the application, to enhance the user's perception that the application can be quickly started and immediately put into use, and further enhance user experience when the application is started. For example, a brand, an advertisement, a campaign, or the like may be displayed on the launch page, and a plurality of display modes such as a still picture, a dynamic picture, and an animation may be used. Because an initialization time of the application generally does not exceed five seconds, control duration of the launch page is generally not longer than five seconds either. FIG. 4(a) shows an example in which an image-text fused image is used as a launch page of an APP. Control duration of the launch page of the APP is three seconds.

The guide page may be a page used to guide the user to learn application usage or understand application functions, and that a core of the guide page lies in the word "guide". A guide page usually appears on an application of a new concept or after a product iteration. FIG. 4(b) shows an example in which an image-text fused image is applied to a guide page of an APP. The guide page of the APP includes three guide pictures (as shown in FIG. 4(c)). The mobile phone may switch between guide images in response to the user's operation of swiping left/right on a touchscreen.

Figure 5:
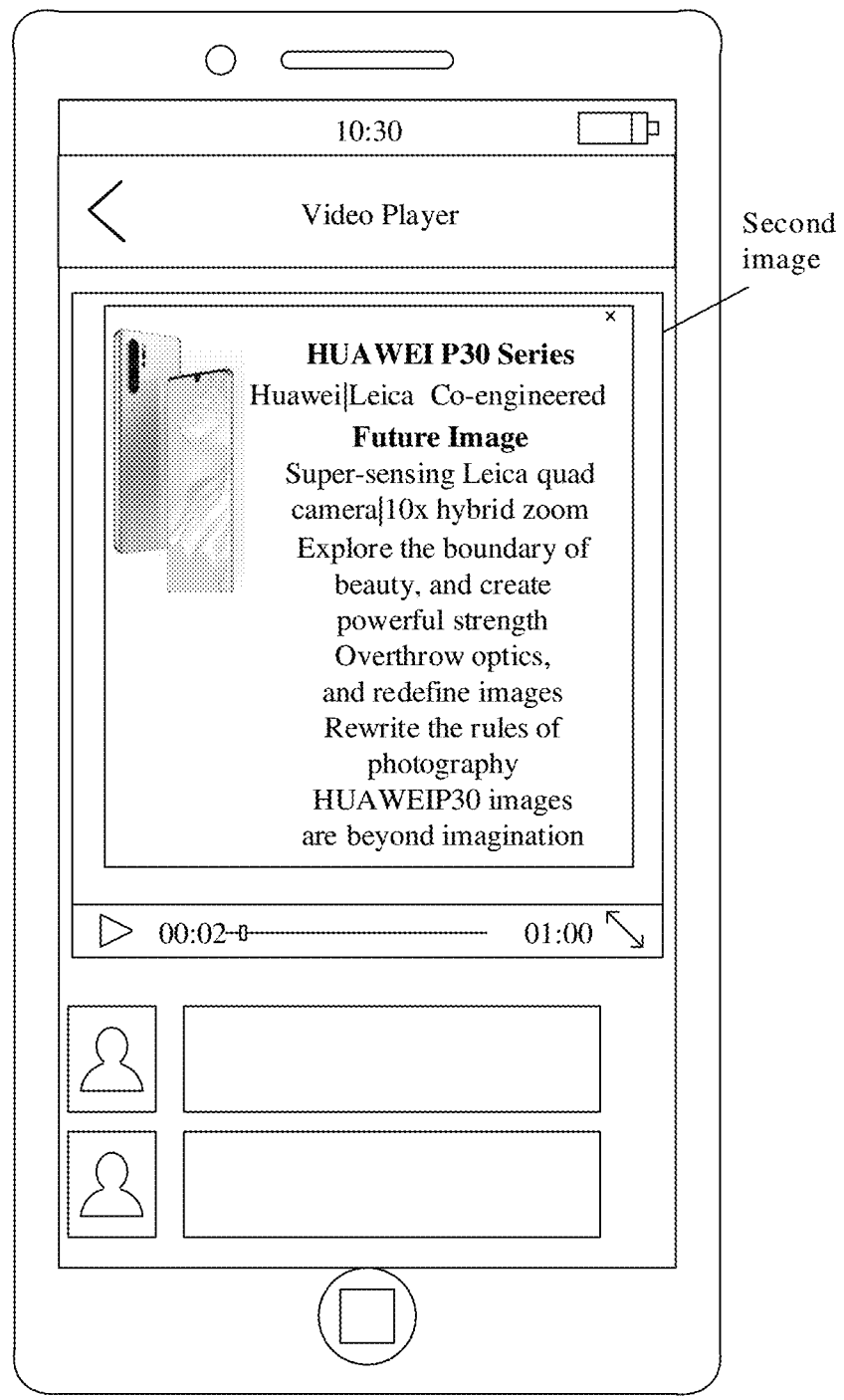
FIG. 5 is still another example of a scenario of image-text fusion according to an embodiment.

Example 3: An Image-Text Fused Image is Applied to an Application Interface, for Example, a Floating Advertising Box in a Video Playback Window For example, when the mobile phone detects that a video playback pause button is tapped, the mobile phone may display, in the video playback window, an interface of the suspended floating advertising box, as shown in FIG. 5.

Example 4: An Image-Text Fused Image is Displayed on a Traditional Image Transmission Medium, for Example, Displayed in a Newspaper, in a Magazine, on Television, or in an Outdoor Advertising Position For this example, refer to image displaying on the traditional transmission medium. Details are not described herein again.

It should be noted that the foregoing Example 1 to Example 4 are merely examples of possible application scenarios of several image-text fused images (such as the second image or the third image). The image-text fused image may be further applied to another scenario. This is not limited in the embodiments.

Assuming that the image-text fusion method in the embodiments is applied to a mobile phone having the hardware structure shown in FIG. 2, the following describes in detail the image-text fusion method provided in the embodiments.

In the embodiments, the mobile phone may perform some or all of the steps in the embodiments. The steps or operations are merely examples. In the embodiments, other operations or variations of various operations may be further performed. In addition, the steps may be performed in a sequence different from a sequence presented in the embodiments, and not all operations in the embodiments may be performed.

Figure 6:
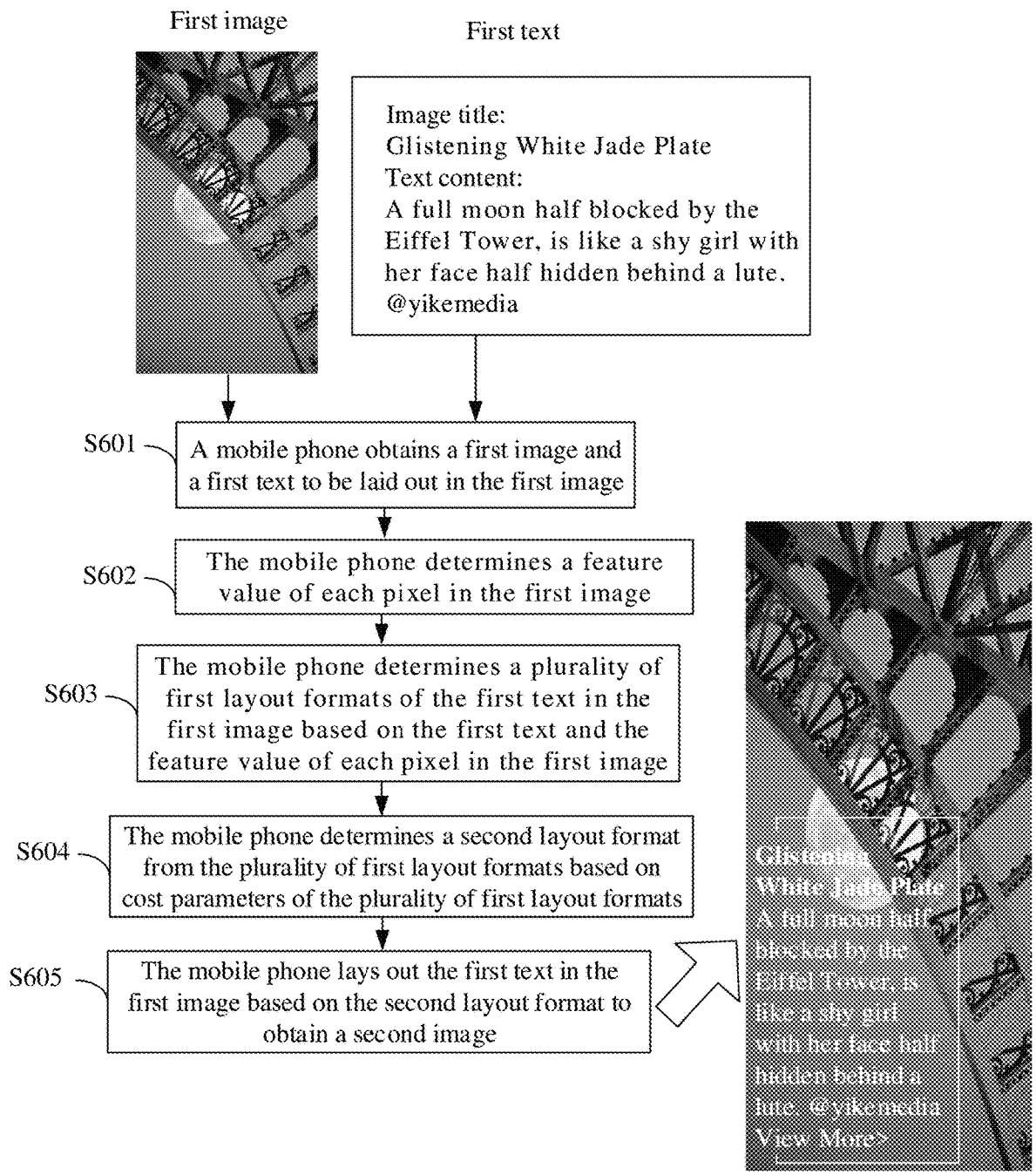
FIG. 6 is a flowchart of an image-text fusion method according to an embodiment.

As shown in FIG. 6, an image-text fusion method in an embodiment may include S601 to S605.

S601. Obtain a first image and a first text to be laid out in the first image.

The first image is an image to which a text is to be added. The first text is a text to be laid out in the first image. The first text may correspond to image content of the first image.

The first text corresponding to the image content of the first image means that the first text may be used to explain and describe image information in the first image; or the first text is consistent with a subject described by image information in the first image; or the first text is associated with an artistic conception conveyed by image information in the first image. As shown in FIG. 6, the first image is an image that includes a moon image feature and an Eiffel Tower image feature, the first text may be a text entitled "Glistening White Jade Plate", and content of the text includes "A full moon half blocked by the Eiffel Tower, is like a shy girl with her face half hidden behind a lute. @yikemedia". As can be learned, the text entitled "Glistening White Jade Plate" in FIG. 6 is an explanation and a description of the image information in the first image in FIG. 6.

In some embodiments, the first image and the first text may be obtained by the mobile phone from a third party. For example, the mobile phone periodically obtains the first image and the first text from a server of a mobile phone manufacturer.

Alternatively, the first image may be a picture taken locally by the mobile phone, and the first text may be a user-defined text received by the mobile phone. For example, the first image is an image determined by the mobile phone receiving an image selection operation of a user, and the first text is a text input by the user and received by the mobile phone. Specific sources of the first image and the first text quantity are not limited in this embodiment.

In some embodiments, the first image may correspond to only one set of text data. For example, in FIG. 1, an image including a building feature corresponds to only a text entitled "Glimpse of the Countryside". In this case, the first text obtained by the mobile phone is the text entitled "Glimpse of the Countryside".

Figure 7A:
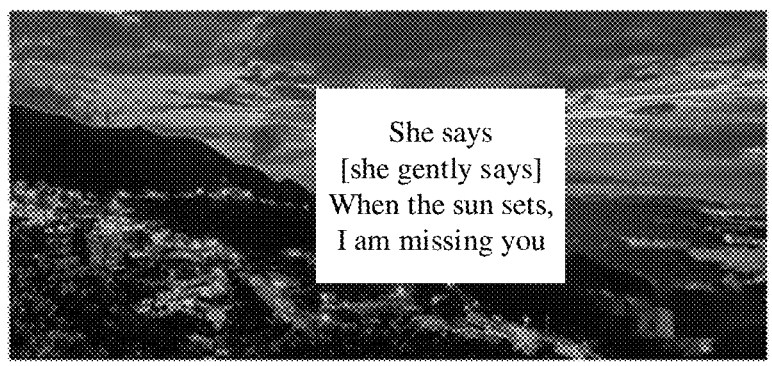
FIG. 7(a) and FIG. 7(b) are example diagrams in which a same image corresponds to different texts according to an embodiment.
Figure 7B:

In some other embodiments, the first image may correspond to a plurality of sets of text data. For example, corresponding first images in FIG. 7(a) and FIG. 7(b) are the same, but corresponding text data is different.

When the first image corresponds to a plurality of sets of text data, which set in the plurality of sets of text data is obtained when the mobile phone obtains the first text, may be determined based on ranking of a matching degree between the first image and each set of text data, or may be determined randomly, or may be determined according to an order. This is not limited in the embodiments.

For example, when producing a guide page shown in FIG. 4(c), the mobile phone may first obtain the first image and text data entitled "Feel You", and then lays out the text data entitled "Feel You" in the first image by using the image-text fusion method in this embodiment, to obtain a first guide page. Then the mobile phone sequentially obtains text data entitled "Fashion" and "Trust", and sequentially obtains a second guide page, a third guide page, a fourth guide page, a fifth guide page, and the like by using the image-text fusion method in this embodiment.

S602. The mobile phone determines a feature value of each pixel in the first image.

A feature value of a pixel is used to represent a probability that the user pays attention to the pixel. If the feature value of the pixel is greater, the probability that the user pays attention to the pixel is higher.

In some embodiments, that the mobile phone determines a feature value of each pixel in the first image may include: the mobile phone determines at least two parameters of a visual saliency parameter, a face feature parameter, an edge feature parameter, and a text feature parameter of each pixel in the first image by performing feature detection on the first image; and then the mobile phone performs weighted summation on the determined at least two parameters of the visual saliency parameter, the face feature parameter, the edge feature parameter, and the text feature parameter of each pixel in the first image to determine the feature value of each pixel in the first image.

The feature detection is used to recognize image features in the image, for example, recognize a face feature, a human body feature, a building feature, features of things, (for example, an animal feature, a tree feature, and a flower feature), a character feature, a river feature, and a mountain feature in the image.

Alternatively, after feature detection is performed on the first image, the mobile phone may separately obtain at least two of a first feature map, a second feature map, a third feature map, and a fourth feature map of the first image. A pixel value of each pixel in the first feature map is a visual saliency parameter of the corresponding pixel. A pixel value of each pixel in the second feature map is a face feature parameter of the corresponding pixel. A pixel value of each pixel in the third feature map is an edge feature parameter of the corresponding pixel. A pixel value of each pixel in the fourth feature map is a text feature parameter of the corresponding pixel.

Correspondingly, the mobile phone may perform weighted summation on the at least two of the first feature map, the second feature map, the third feature map, and the fourth feature map of the first image to obtain a feature map of the first image. In the feature map of the first image, a pixel value of each pixel represents a probability that the user pays attention to the pixel.

The mobile phone may perform weighted summation on the first feature map, the second feature map, the third feature map, and the fourth feature map of the first image to obtain a feature map of the first image may include: the mobile phone performs weighted summation on pixel values of each pixel in the at least two of the first feature map, the second feature map, the third feature map, and the fourth feature map to determine the feature value of each pixel in the first image; and then the mobile phone obtains the feature map of the first image based on the feature value of each pixel in the first image.

For example, in this embodiment, the mobile phone may perform visual saliency feature detection on the first image by using a visual saliency detection algorithm, to determine the visual saliency parameter of each pixel in the first image. A principle of the visual saliency detection algorithm may be to determine a visual saliency feature by calculating a difference between pixels in an image. By using the visual saliency detection algorithm, the mobile phone can obtain image features that a human visual system is concerned about. FIG. 8(a) shows an example of the first image. The mobile phone performs visual saliency feature detection on the first image by using the visual salient region detection algorithm, to obtain the first feature map (as shown in FIG. 8(b)). For another example, FIG. 9(a) shows an example of the first image. The mobile phone performs visual saliency feature detection on the first image by using the visual salient region detection algorithm, to obtain the first feature map (as shown in FIG. 9(b)). In FIG. 8(b) and FIG. 9(b), luminance of each pixel is used to identify a feature value of an image feature of the pixel, and higher luminance represents a greater feature value of the image feature of the pixel.

In this embodiment, the visual saliency detection algorithm may be a visual saliency detection algorithm based on a multi-feature absorption Markov chain, a visual saliency detection algorithm based on global color contrast, or a visual saliency detection algorithm combining a corner convex hull and Bayesian inference, or may be a visual saliency detection algorithm based on deep learning (for example, based on a convolutional neural network), or the like. This is not limited in this embodiment.

Figure 10:
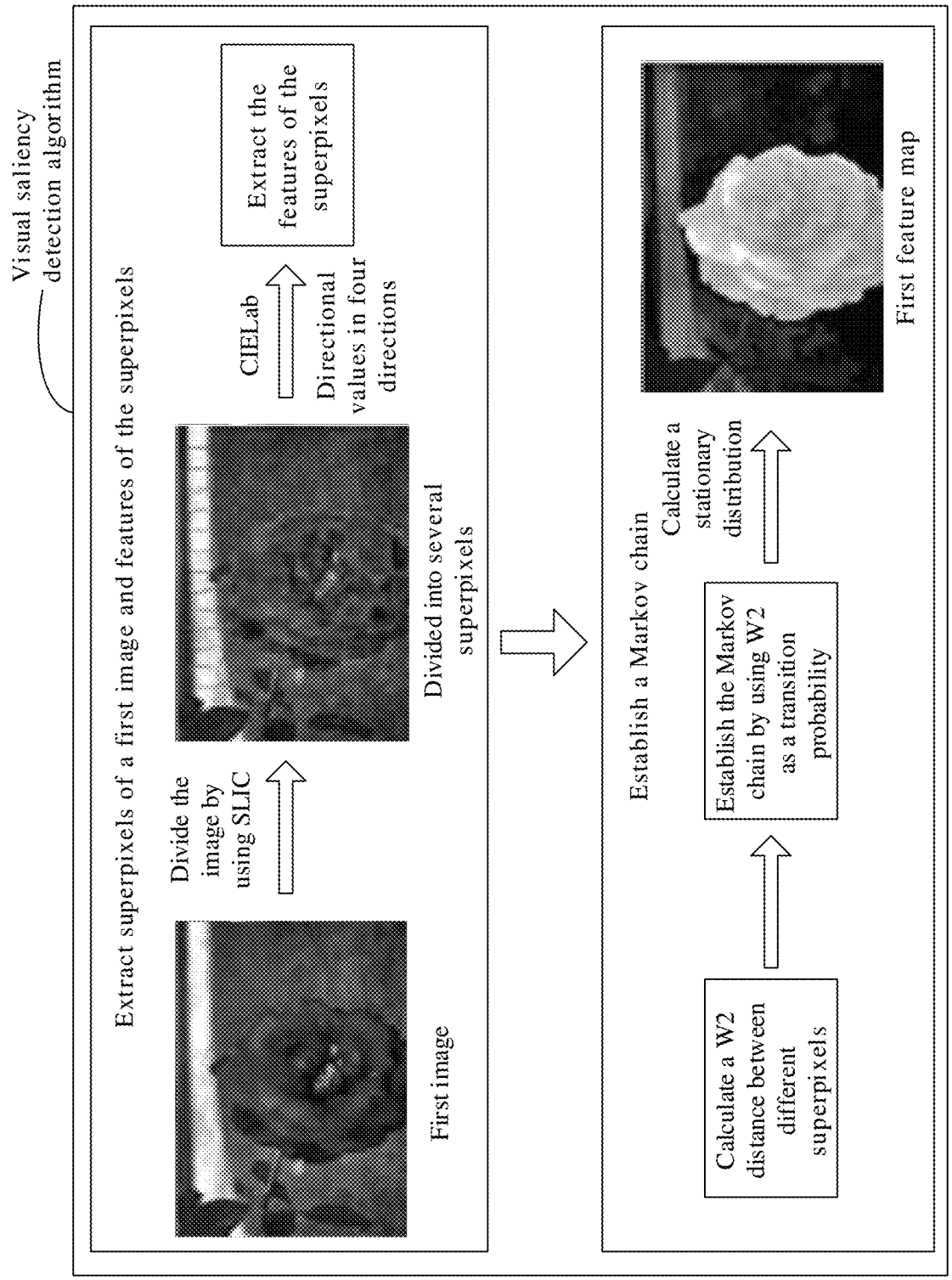
FIG. 10 is a schematic diagram of a process of generating a visual saliency feature map according to an embodiment.

For example, FIG. 10 is a flowchart of a visual saliency detection algorithm based on a multi-feature absorption Markov chain according to an embodiment. As shown in FIG. 10, the algorithm mainly includes two steps. The first step is to extract superpixels of the image and features of the superpixels. The second step is to establish a Markov chain based on the extracted superpixels and features. In the first step, a simple linear iterative clustering (SLIC) algorithm may be used to segment the first image into several superpixels. Then colors of all pixels in the superpixels are fitted into a CIELab three-dimensional normal distribution, and directional values of each pixel in four directions (0°, 45°, 90°, and 135°) are added and fitted to obtain a four-dimensional normal distribution feature. Because a region is used as a basic unit during human observation of an image. Drawing on this visual property, the visual saliency detection algorithm based on the multi-feature absorption Markov chain may use a superpixel as a basic processing unit. An association is established between all the superpixels in the image, and then a final stationary distribution is used as the first feature map.

In the obtained first feature map shown in FIG. 10, a relatively bright pixel in the first feature map may correspond to a saliency feature of the first image, and higher brightness represents a higher probability that the user pays visual attention to the pixel.

For example, in this embodiment, the mobile phone may perform face feature detection on the first image by using a face detection algorithm, to determine the face feature parameter of each pixel in the first image. The face detection algorithm may be used to detect a face feature in an image. As shown in FIG. 9, by using the face detection algorithm, the mobile phone performs face detection on the first image shown in FIG. 9(a), to obtain the second feature map (as shown in FIG. 9(c)). In FIG. 9(c), a pixel distribution region with relatively high luminance corresponds to a face region in the first image. For another example, as shown in FIG. 8, by using the face detection algorithm, the mobile phone performs face detection on the first image shown in FIG. 8(a) and detects that the image does not include a face. Therefore, there is no face feature in the obtained second feature map (as shown in FIG. 8(c)).

In this embodiment, the face detection algorithm may be a face detection algorithm based on computer vision (for example, a face detection algorithm based on a histogram of oriented gradients (HOG)), or may be a face detection algorithm based on deep learning (for example, based on the convolutional neural network), or the like. This is not limited in this embodiment.

Figure 11:
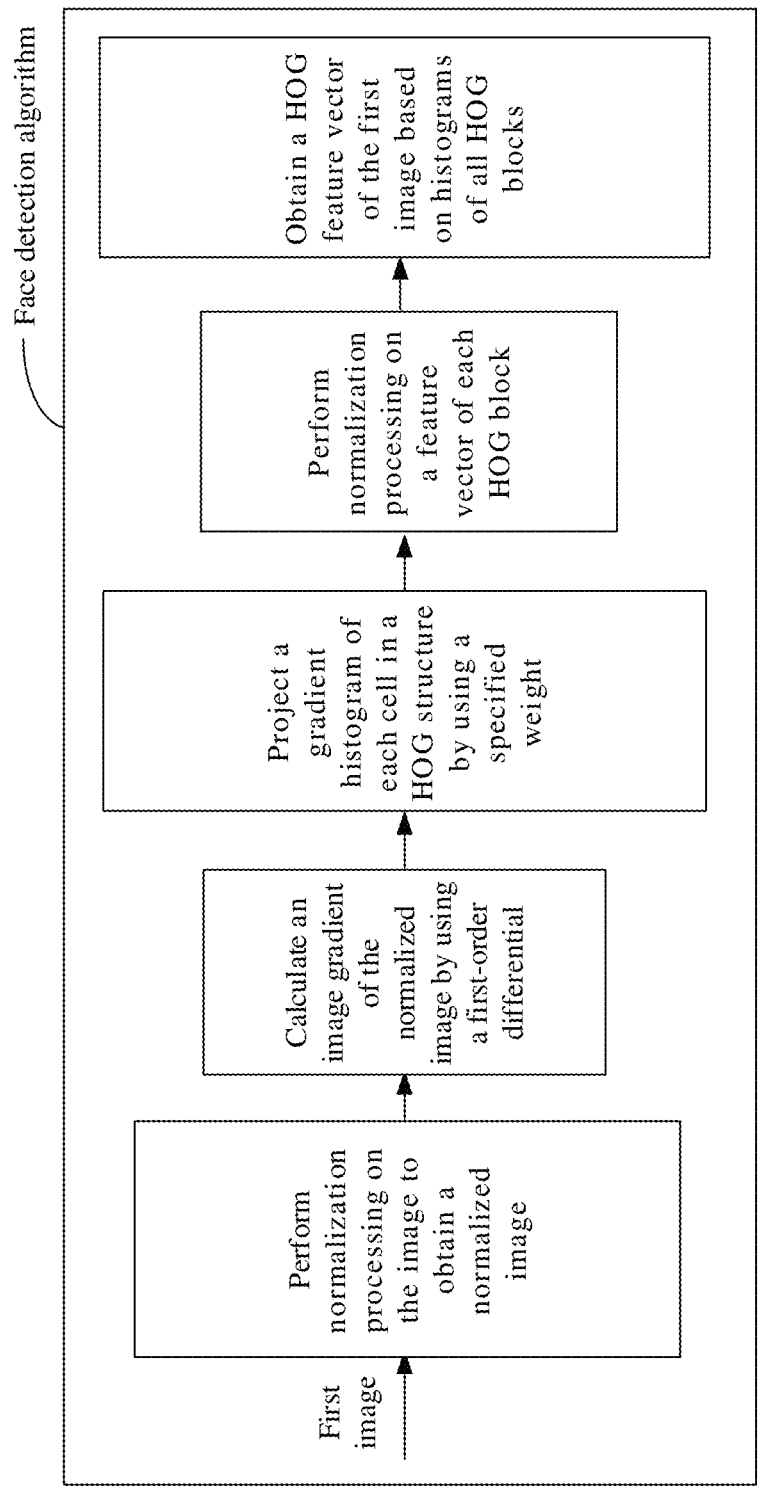
FIG. 11 is a flowchart of a face detection algorithm according to an embodiment.

For example, FIG. 11 is a flowchart of a HOG-based face detection algorithm according to an embodiment. As shown in FIG. 11, after the first image is obtained, image normalization may be performed on the first image first. Image normalization is a process of performing a series of standard processing and transformations on an image to transform the image into a fixed standard form, and the standard image is referred to as a normalized image. The normalized image has invariant properties for affine transformations such as translation, rotation, and scaling. Then an image gradient of the normalized image is calculated by using a first-order differential. Then the normalized image is divided into HOG blocks, a gradient histogram is drawn for each cell in a HOG structure after the division, and then the gradient histogram of each cell is projected with a specified weight. Then normalization processing is performed on a feature vector of each cell block, so that a feature vector space of each cell block has invariant properties for illumination, shadow, and edge changes. Finally, histogram vectors of all HOG blocks are combined into one HOG feature vector, to obtain a HOG feature vector of the first image, that is, the second feature map.

For example, in this embodiment, the mobile phone may perform edge feature detection on the first image by using an edge detection algorithm, to determine the edge feature parameter of each pixel in the first image. The edge detection algorithm may be used to extract edge gradient features of a region (for example, a grassland, woods, a mountain, and water waves) with complex textures in an image. As shown in FIG. 8, by using the edge detection algorithm, the mobile phone performs edge detection on the first image shown in FIG. 8(a), to obtain the third feature map (as shown in FIG. 8(d)). The third feature map is used to identify a structural texture of the Eiffel Tower in the first image. For another example, as shown in FIG. 9, by using the edge detection algorithm, the mobile phone performs edge detection on the first image shown in FIG. 9(a), to obtain the third feature map (as shown in FIG. 9(d)). The third feature map is used to identify a human body contour in the first image.

In this embodiment, the edge detection algorithm may be a Laplace operator, a Canny algorithm, a Prewitt operator, a Sobel operator, or the like. This is not limited in this embodiment.

Figure 12:
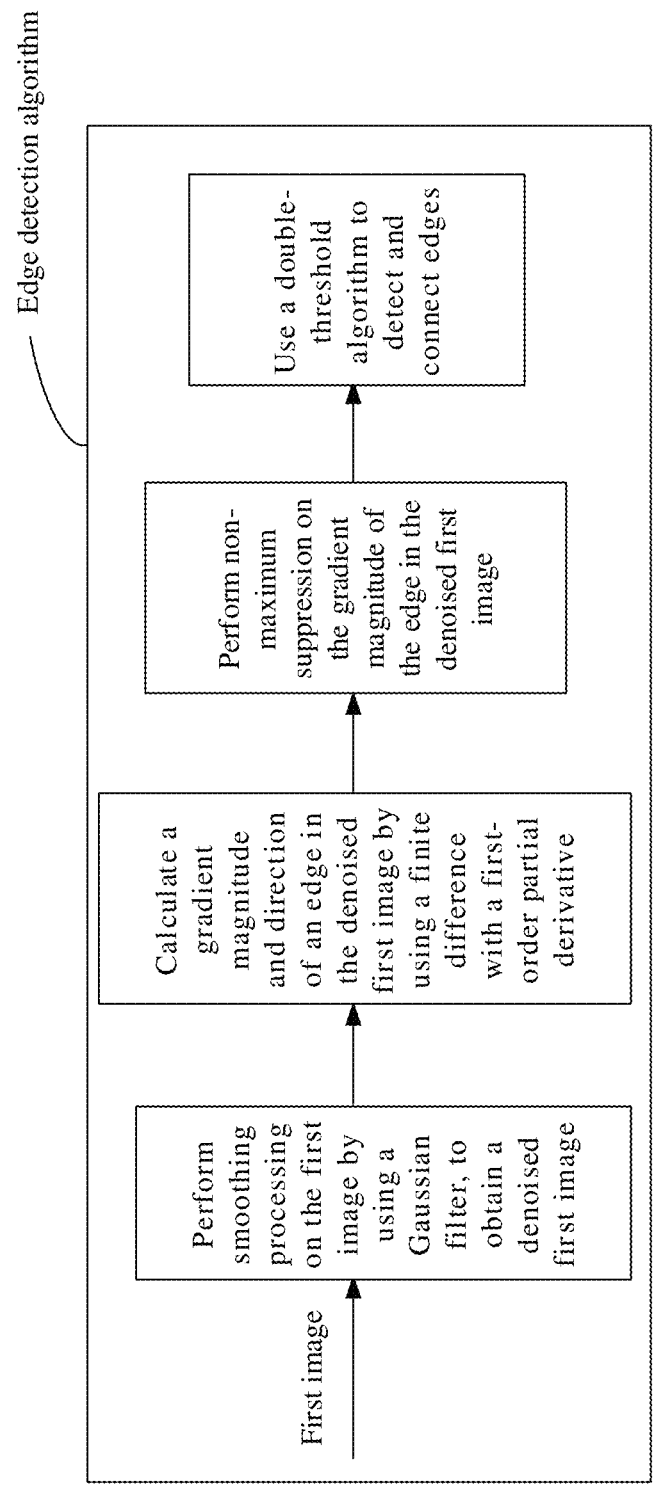
FIG. 12 is a flowchart of an edge detection algorithm according to an embodiment.

For example, FIG. 12 is a flowchart of an edge detection algorithm based on a Canny algorithm according to an embodiment. The Canny algorithm is a method for smoothing and derivation. As shown in FIG. 12, by using the Canny algorithm, smoothing processing may be performed on the first image first by using a Gaussian filter. Smoothing processing means denoising an image (for example, suppressing image noise, or suppressing high frequency interference), so that image luminance gradually changes, thereby reducing an abrupt gradient and improving image quality. After the denoised first image is obtained, a gradient magnitude and direction of an edge in the denoised first image may be calculated by using a finite difference with a first-order partial derivative. Then non-maximum suppression is performed on the gradient magnitude of the edge in the denoised first image. Finally, a double-threshold algorithm is used to detect and connect edges to obtain the third feature map.

For example, in this embodiment, the mobile phone may perform text feature detection on the first image by using a text detection algorithm, to determine the text feature parameter of each pixel in the first image. The text detection algorithm may be used to extract a word or character feature existing in an image (for example, an image related to a calendar or a solar term, or an image of an advertisement or a poster, or the like). As shown in FIG. 8, by using the text detection algorithm, the mobile phone performs text detection on the first image shown in FIG. 8(a), to obtain the fourth feature map (as shown in FIG. 8(e)). For another example, as shown in FIG. 9, by using the text detection algorithm, the mobile phone performs text detection on the first image shown in FIG. 9(a), to obtain the fourth feature map (as shown in FIG. 9(e)). Because neither the first image example shown in FIG. 8(a) nor the first image example shown in FIG. 9(a) includes any text, there is no text feature in the obtained FIG. 8(e) and FIG. 9(e).

In this embodiment, the text detection algorithm may be a text detection algorithm based on a computer gradient and an expansion and erosion operation or may be a text detection algorithm based on deep learning (for example, based on the convolutional neural network). This is not limited in this embodiment.

Figure 13:
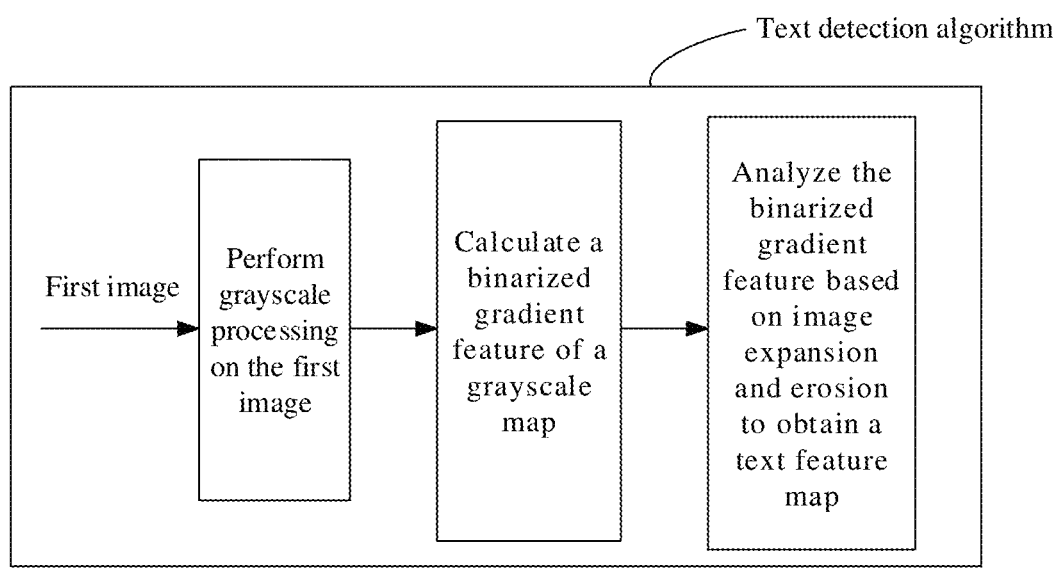
FIG. 13 is a flowchart of a text detection algorithm according to an embodiment.

For example, FIG. 13 is a flowchart of a text detection algorithm based on a computer gradient and an expansion and erosion operation according to an embodiment. As shown in FIG. 13, in the text detection algorithm based on the computer gradient and the expansion and erosion operation, first, grayscale processing may be performed on the first image to reduce a calculation amount. Then a gradient feature of a grayscale map is calculated, and the gradient feature is binarized. Then the binarized gradient feature is processed by using the image expansion and erosion operation. If a gradient feature of an image region satisfies a given threshold, the region may be considered as a text feature region. A text feature map may be obtained by using the foregoing method.

It should be noted that the visual saliency detection algorithm based on the multi-feature absorption Markov chain according to this embodiment, as shown in FIG. 10, the HOG-based face detection algorithm, as shown in FIG. 11, the edge detection algorithm based on the Canny algorithm, as shown in FIG. 12, and the text detection algorithm based on the computer gradient and the expansion and erosion operation, as shown in FIG. 13, are merely several calculation examples. The specific visual saliency detection algorithm, face detection algorithm, edge detection algorithm, and text detection algorithm are not limited in this embodiment.

In addition, specific processing details in the visual saliency detection algorithm based on the multi-feature absorption Markov chain according to this embodiment, as shown in FIG. 10, the HOG-based face detection algorithm, as shown in FIG. 11, the edge detection algorithm based on the Canny algorithm, as shown in FIG. 12, and the text detection algorithm based on the computer gradient and the expansion and erosion operation, as shown in FIG. 13, are not limited in this embodiment. The foregoing algorithms and processes may further have other variations. For specific details and processes of the foregoing algorithms, refer to details and processes of conventional technologies. Details are not described in this embodiment.

In this embodiment, for example, if the mobile phone determines the visual saliency parameter, the face feature parameter, the edge feature parameter, and the text feature parameter of each pixel in the first image, the mobile phone may perform, by using the following formula, weighted summation on the visual saliency parameter, the face feature parameter, the edge feature parameter, and the text feature parameter of each pixel in the first image to determine the feature value of each pixel in the first image:

$$F_c(x,y) = \alpha * F_{sal}(x,y) + \beta * F_{face}(x,y) + \gamma * F_{edge}(x,y) + \eta * F_{text}(x,y),$$

where $F_c(x,y)$ is a feature value of a pixel (x,y) in the first image, $F_{sal}(x,y)$ is a visual saliency parameter of the pixel (x,y) in the first image, $F_{face}(x,y)$ is a face feature parameter of the pixel (x,y) in the first image, $F_{edge}(x,y)$ is an edge feature parameter of the pixel (x,y) in the first image, and $F_{text}(x,y)$ is a text feature parameter of the pixel (x,y) in the first image. $\alpha$, $\beta$, $\gamma$, and $\eta$ are weight parameters corresponding to the visual saliency parameter, the face feature parameter, the edge feature parameter, and the text feature parameter.

In this embodiment, specific values of α, β, γ, and η may be determined based on importance of different parameters. For example, importance of the visual saliency parameter, the face feature parameter, the edge feature parameter, and the text feature parameter may be ranked as follows: Face feature parameter>Text feature parameter>Visual saliency parameter>Edge feature parameter. In this case, for example, α, β, γ, and η may be set to 0.2, 0.4, 0.1, and 0.3 respectively. Alternatively, importance of the visual saliency parameter, the face feature parameter, the edge feature parameter, and the text feature parameter may be ranked as follows: Face feature parameter=Text feature parameter>Visual saliency parameter>Edge feature parameter. In this case, for example, α, β, γ, and η may be set to 0.2, 0.4, 0, and 0.4 respectively. Alternatively, γ being 0 may be understood as ignoring the edge feature parameter when the feature value of each pixel in the first image is determined.

In this embodiment, $F_c(x,y)$ of each pixel corresponds to the feature map of the first image (for example, FIG. 8(*f*) and FIG. 9(*f*)). Brightness of the pixel (x,y) in the first image represents a magnitude of an F(x,y) value of the pixel. If the brightness is higher, it represents that the F(x,y) value of the pixel is greater.

S603. The mobile phone determines a plurality of first layout formats of the first text in the first image based on the first text and the feature value of each pixel in the first image.

The first layout format may be the candidate layout format described above. The first layout format is used to represent at least a text template of the first text and a layout position of the first text in the first image.

The text template may specify at least one or more of the following: a text title, a text line spacing, a line width, a font size, a font, a character thickness, an alignment mode, a layout form, a decorative line position, a decorative line thickness, and the like. The layout form may include at least a vertical layout, a horizontal layout, or the like.

In some embodiments, the text template may be stored in an object notation (JSON) format, an extensible markup language (XML) format, a code segment format, or another text format. This is not limited in this embodiment.

FIG. 14 is an example diagram of a layout specification of a JSON format according to an embodiment.

In some embodiments, the plurality of text templates in this embodiment may be designed in advance, and stored in the mobile phone, or stored on the server of the mobile phone manufacturer. Alternatively, in an embodiment of another scenario of a second image, the text template may be further stored in another corresponding position. This is not limited in this embodiment.

Figure 15:
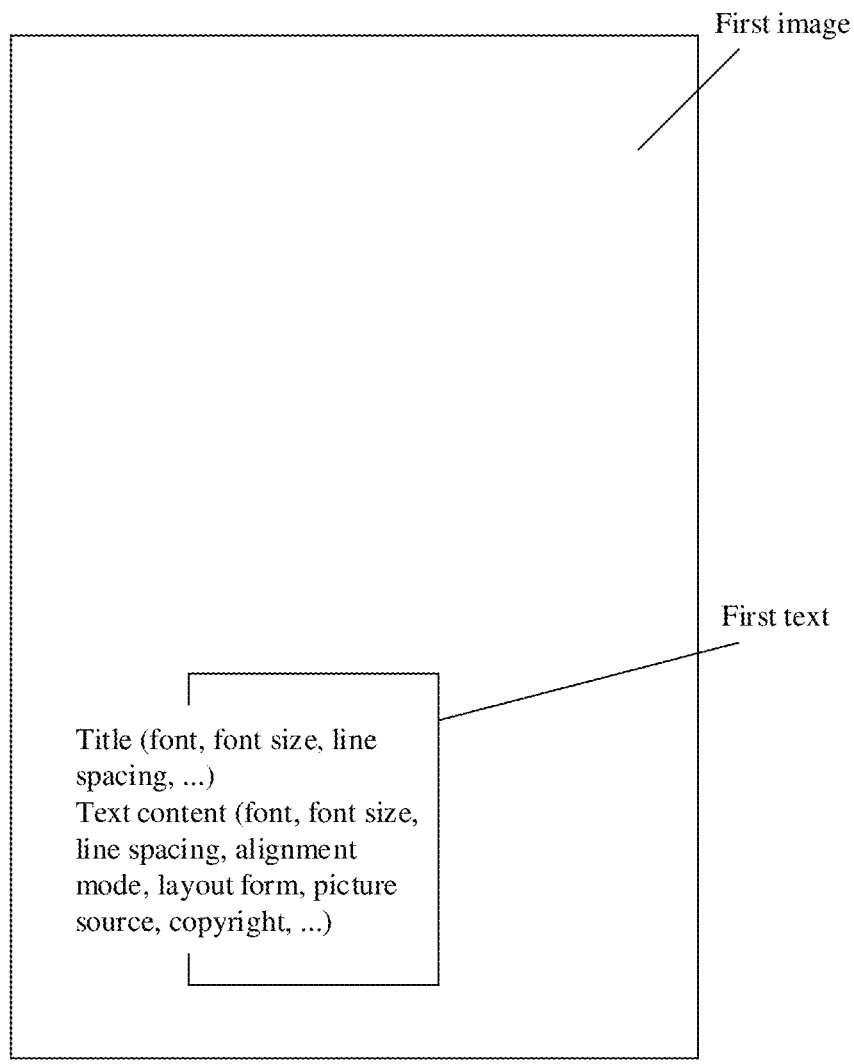
FIG. 15 is a schematic diagram of a layout position of a text box according to an embodiment.

In this embodiment, the layout position of the first text in the first image is used to represent a relative position of the first text in the first image when the first text is laid out in the first image based on the first layout format. The layout position of the first text in the first image may include at least any one of: upper left, upper right, middle, lower left, lower right, middle top, middle bottom, and the like. For example, FIG. 15 is a schematic diagram of the layout position of the first text in the first image according to an embodiment. As shown in FIG. 15, the layout position of the first text in the first image is "lower left".

In some embodiments, the layout position of the first text in the first image may be a default layout position. The default layout position is a preset layout position. The default layout position may be any one of layout positions such as upper left, upper right, middle, lower left, lower right, middle top, and middle bottom.

In this embodiment, the mobile phone may determine, based on a size of a text box of the first text when the first text is laid out by using a text template, and with reference to the feature value of each pixel in the first image (or the feature map of the first image), the layout position of the first text in the first image. so that the first text does not block a pixel whose feature value is greater than a first threshold in the first image.

An image feature corresponding to the pixel whose feature value is greater than the first threshold in the first image may be the foregoing saliency feature, that is, an image feature with a relatively high probability of attracting attention of the user. Therefore, the position determined by the mobile phone for laying out the first text in the first image can enable the first text not to block the saliency feature in the first image.

When the mobile phone uses a text template for the layout, a plurality of layout positions may meet the foregoing condition. In addition, when the first text is laid out by using different text templates, the size of the text box of the first text varies. FIG. 16(*a*), FIG. 16(*b*), and FIG. 16(*c*) are several example diagrams in which the first text is laid out by using different text templates according to an embodiment. Therefore, the layout positions of the first text in the first image may also be different when the first text is laid out by using different text templates. Therefore, the mobile phone can determine a plurality of layout positions for laying out the first text in the first image. Correspondingly, the mobile phone determines a plurality of second layout formats.

For example, the feature map of the first image shown in FIG. 8(*f*) is used as an example to describe a plurality of candidate layout formats (that is, the plurality of first layout formats) determined by the mobile phone. As shown in FIG. 17, the mobile phone may determine three candidate layout formats based on the first image shown in FIG. 8(*a*) and the to-be-fusing first text: a candidate layout format 1 (as shown in FIG. 17(*a*)), a candidate layout format 2 (as shown in FIG. 17(*b*)), and a candidate layout format 3 (as shown in FIG. 17(*c*)).

In the case shown in FIG. 17, the mobile phone needs to further determine an optimal layout format of the first text from the candidate layout format 1, the candidate layout format 2, and the candidate layout format 3, that is, the mobile phone performs S604.

S604. The mobile phone determines a second layout format from the plurality of first layout formats based on cost parameters of the plurality of first layout formats.

A cost parameter of a first layout format is used to represent a magnitude of a feature value of a pixel blocked by the first text when the first text is laid out in the first image based on the first layout format, and a balance degree of feature value distribution of pixels in each region in the first image in which the first text is laid out.

In some embodiments, the mobile phone may set, in the plurality of first layout formats, a first layout format that can minimize a feature value of a pixel blocked by the first text when the first text is laid out in the first image based on the first layout format and that can best balance feature value distribution of pixels in each region in the first image in which the first text is laid out, as the second layout format.

S605. The mobile phone lays out the first text in the first image based on the second layout format to obtain a second image.

Figure 18:
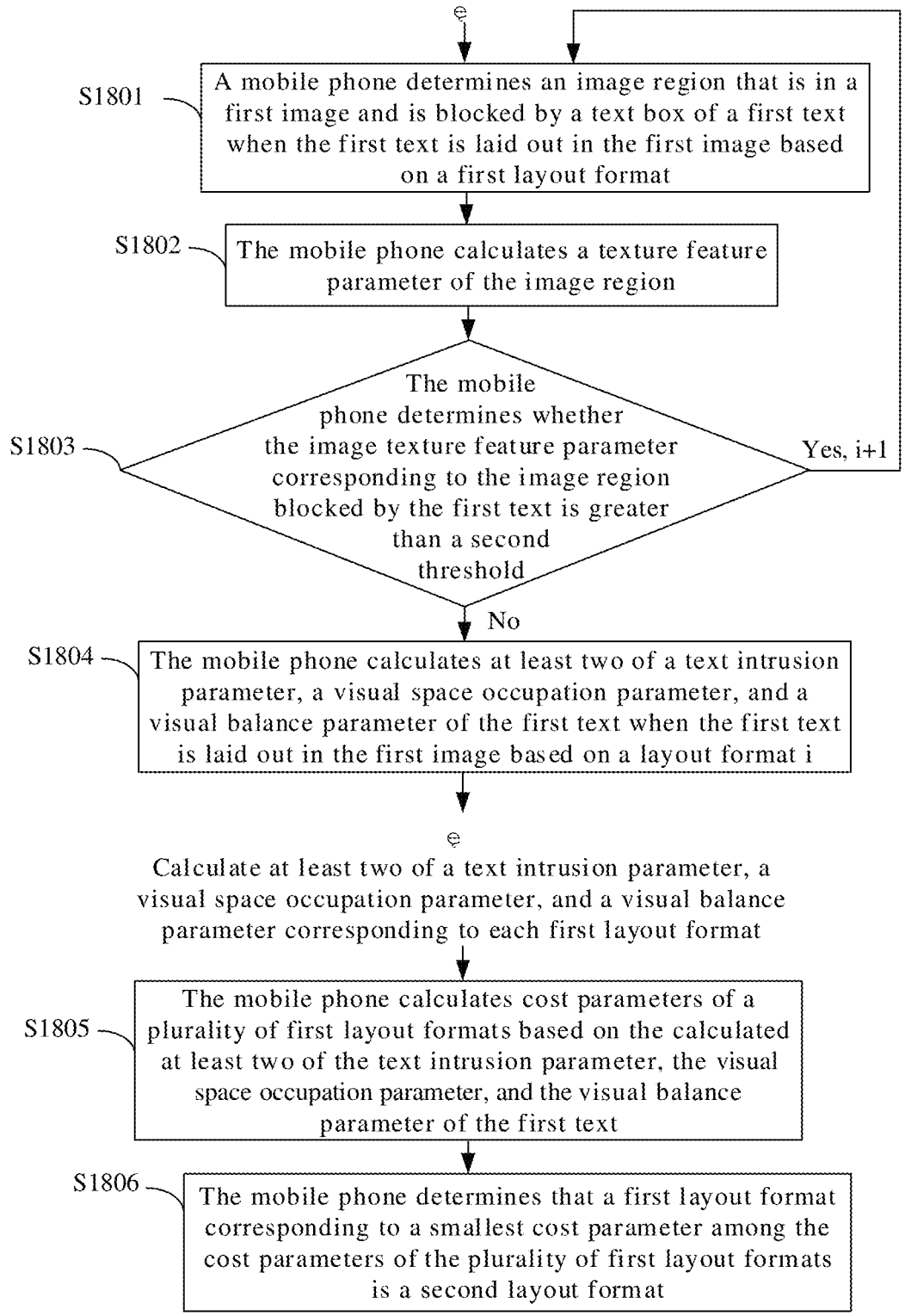
FIG. 18 is a flowchart of a method for determining a second layout format according to an embodiment.
Figure 19:
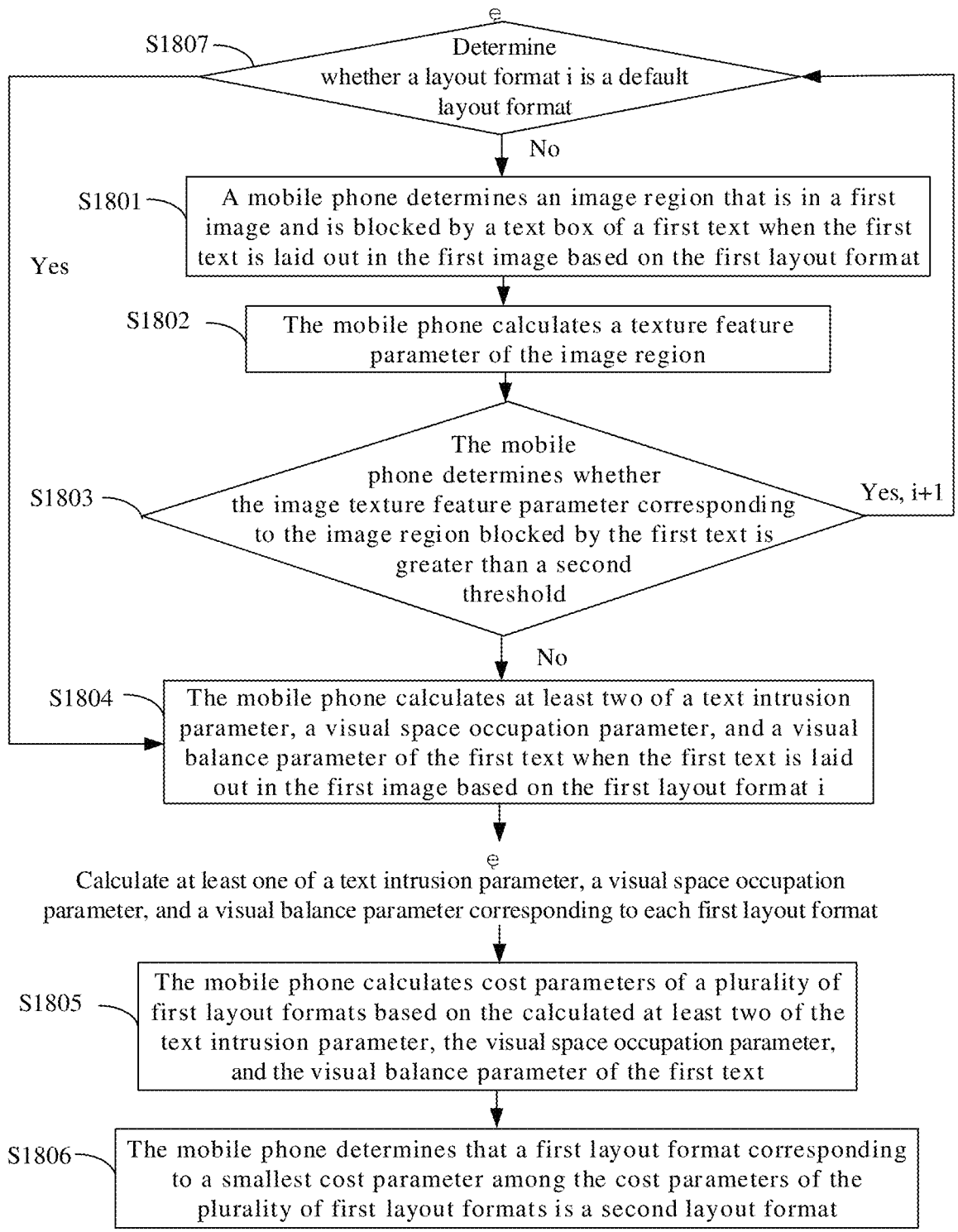
FIG. 19 is a flowchart of another method for determining a second layout format according to an embodiment.

In some embodiments, as shown in FIG. 18, that the mobile phone determines a second layout format from the plurality of first layout formats based on cost parameters of the plurality of first layout formats (that is, S604) may include S1801 to S1806.

S1801. The mobile phone determines the image region that is in the first image and is blocked by the text box of the first text when the first text is laid out in the first image based on one first layout format.

The layout format i is any first layout format determined by the mobile phone.

S1802. The mobile phone calculates the texture feature parameter of the image region.

The texture feature parameter of the image region is used to represent a quantity of texture features corresponding to the image region in the image.

In a possible implementation, the mobile phone may first obtain a grayscale image corresponding to the image region, and then calculate a texture feature parameter of the grayscale image.

The grayscale image is an image obtained through grayscale processing. The processing is used to reduce a calculation amount. The image after the grayscale processing may present a distribution of white→grey→black. A pixel whose grayscale value is 0 displays white, and a pixel whose grayscale value is 255 displays black.

For example, the mobile phone may calculate the texture feature parameter of the image region based on an angular second moment, a contrast, entropy, and the like of a gray-level co-occurrence matrix, or a variance between image gray corresponding to the image region and a gradient. Alternatively, reference may be made to the foregoing edge feature detection algorithm for calculation and another conventional edge feature detection algorithm or texture feature detection algorithm. Details are not described herein again.

S1803. The mobile phone determines whether the texture feature parameter of the image corresponding to the image region blocked by the first text is greater than a second threshold. If the texture feature parameter of the image corresponding to the image region blocked by the first text is less than the second threshold, the mobile phone performs S1804. If the texture feature parameter of the image corresponding to the image region blocked by the first text is greater than the second threshold, the mobile phone discards the layout format i, makes i+1, and performs S1801 again until S1801 to S1803 are performed completely for each first layout format.

The second threshold is a preset threshold. For example, the second threshold is 125. For the first layout format in which the texture feature parameter of the image corresponding to the image region blocked by the first text is greater than 125, the texture feature of the image region may be too complex. If the first text is laid out here, presentation of the texture feature and the first text may be affected at the same time. In this case, the mobile phone may abandon using the first layout format to lay out the first text.

S1804. The mobile phone calculates at least two of a text intrusion parameter, a visual space occupation parameter, and a visual balance parameter of the first text when the first text is laid out in the first image based on the first layout format i.

The text intrusion parameter is a ratio of a first parameter to a second parameter. The first parameter is a sum of feature values of pixels in an image region blocked by the first text in the first image. The second parameter is an area of the image region, or the second parameter is a total quantity of pixels in the image region, or the second parameter is a product of a total quantity of pixels in the image region and a preset value.

For example, the text intrusion parameter $E_s(L_i)$ of the first text may be calculated based on a formula $$E_s(L_i) = \frac{\sum_{(x,y) \in R(L)} F_c(x, y)}{\sum_{(x,y) \in R(L)} 255}$$

when the first text is laid out in the first image based on the layout format i. R (L) is an image region blocked by the first text in the first image when the first text is laid out in the first image based on the layout format i. x and y are respectively horizontal coordinates and vertical coordinates of pixels in the image region blocked by the first text in the first image. $F_c(x,y)$ is a feature value of a pixel (x,y).

The visual space occupation parameter of the first text is used to represent a proportion of pixels whose feature values are less than a third threshold in the image region.

For example, the visual space occupation parameter $E_u(L_i)$ of the first text may be calculated based on a formula $$E_u(L_i) = \left(1 - \frac{\sum_{(x,y) \in R(L)} 1}{\sum_{I_m(xy) \leq t} 1}\right)$$

when the first text is laid out in the first image based on the layout format i. $I_m(xy)$ is a pixel value of a pixel in an image region that is in the first image and is blocked by the first text after the first text is laid out in the first image based on the layout format i, and t is a maximum feature value in the first image.

The visual balance parameter of the first text is used to represent a degree of impact of the first text on the balance degree of feature value distribution of pixels in each region in the first image in which the first text is laid out.

For example, the visual balance parameter $E_n(L_i)$ of the first text may be calculated based on a formula $E_n(L_i)=b1+b2+b3$ when the first text is laid out in the first image based on the layout format i. b1 is a distance between an image gravity center of a feature map of an image region blocked by the first text in the first image and an image gravity center of a feature map of the first image when the text is laid out in the first image based on the layout format i. b2 is a distance between an image center of the image region blocked by the first text in the first image and a first image center when the first text is laid out in the first image based on the layout format i. b3 is a distance between an image center of the image region blocked by the first text in the first image and an image gravity center of a feature map of the image region blocked by the first text in the first image when the first text is laid out in the first image based on the layout format i.

The image gravity center $(X_c, Y_c)$ may be obtained through calculation based on a formula $$X_c = \frac{\sum_{x \in R(L)} F_c(x, y) \times x}{\sum_{x \in R(L)} x}$$

and a formula $$Y_c = \frac{\sum_{y \in R(L)} F_c(x, y) \times y}{\sum_{y \in R(L)} y}.$$

For example, the candidate layout format shown in FIG. 17(c) is used as an example. P1 is an image gravity center of the feature map of the image region blocked by the first text in the first image when the first text is laid out in the first image based on the layout format i. P2 is an image gravity center of the feature map of the first image. P3 is an image center of the image region blocked by the first text in the first image when the first text is laid out in the first image based on the layout format i. P4 is an image center of the first image. For the candidate layout format shown in FIG. 17 (c), it can be obtained that b1 is a distance between P1 and P2, b2 is a distance between P1 and P4, and b3 is a distance between P1 and P3. By using the same method, b1, b2, and b3 corresponding to each candidate layout format may be obtained through calculation to further obtain the visual balance parameter $E_n(L_i)$ of each candidate layout format.

S1805. The mobile phone calculates cost parameters of a plurality of first layout formats based on at least two of the calculated text intrusion parameter, visual space occupation parameter, and visual balance parameter of the first text.

In some embodiments, the mobile phone may calculate a cost parameter of the layout format i by using any one of the following formula 1, formula 2, and formula 3:

$T_i = \lambda_1 * E_s(L_i) + \lambda_2 * E_u(L_i) + \lambda_3 * E_n(L_i);$      formula 1:

$T_i = (\lambda_1 * E_s(L_i) + \lambda_2 * E_u(L_i)) * E_n(L_i);$ and      formula 2:

$T_i = E_s(L_i) * E_u(L_i) * E_n(L_i).$      formula 3:

$\lambda_1$, $\lambda_2$, and $\lambda_3$ are respectively weight parameters corresponding to $E_s(L_i)$, $E_u(L_i)$, and $E_n(L_i)$, and are used to identify relative importance of $E_s(L_i)$, $E_u(L_i)$, and $E_n(L_i)$. Therefore, value ranges of $\lambda_1$, $\lambda_2$, and $\lambda_3$ may be any value in 0-1. A weight parameter is 0, which may also be understood as that a parameter corresponding to the weight parameter is not considered when the cost parameter of the first layout format is determined. For example, if $\lambda_1$ is 0, the text intrusion parameter of the first text may not be considered when the cost parameter of the first layout format is determined.

It should be noted that in this embodiment, the mobile phone calculates other cost parameters by using a same cost parameter calculation formula (such as the foregoing formula 1, formula 2, or formula 3) for each first layout format. For example, the mobile phone may calculate the cost parameter of each first layout format by using the foregoing formula 1.

In this embodiment, after the mobile phone obtains the visual cost $T_i$ of each first layout format, the mobile phone performs S1806.

S1806. The mobile phone determines that a first layout format corresponding to a smallest cost parameter among the cost parameters of the plurality of first layout formats is the second layout format.

In some embodiments, before S1801, the mobile phone may further perform:

S1807. The mobile phone determines whether the layout format i is a default layout format (for example, middle bottom).

If the layout format i is the default layout format, the mobile phone may directly perform S1804. If the layout format i is not the default layout format, the mobile phone may continue to perform S1801.

in some embodiments, the image-text fusion method in this embodiment may further include: the mobile phone determines a color parameter of the first text.

In some embodiments, the mobile phone may determine the color parameter of the first text before S605. In this case, after S605, the mobile phone may color the first text in the second image based on the color parameter of the first text to obtain a third image. Alternatively, S605 may be: the mobile phone lays out the first text in the first image based on the second layout format and the color parameter of the first text to obtain a second image.

In some other embodiments, the mobile phone may determine the color parameter of the first text after S605. In this case, after the mobile phone determines the color parameter of the first text, the mobile phone may color the first text in the second image based on the color parameter of the first text to obtain a third image.

The color parameter of the first text is used to color each character in the first text.

In some embodiments, the mobile phone may first determine a dominant color of the image region based on tones, saturation, and brightness of three primary colors RGB of the image region blocked by the first text in the first image when the first text is laid out in the first image based on the second layout format, and then use the derivative color of an HSV of the dominant color as the color parameter of the first text.

An RGB color mode is a color standard in the industry, and various colors are obtained by changing red (R), green (G), and blue (B) color channels and by superimposing them. HSV is a color space created based on the intuitive characteristics of color, also referred to as a hexcone model. Color parameters in the hexcone model may include at least: tone (H), saturation (S), and brightness (V).

In this embodiment, the dominant color of the image region is a hue with a highest hue proportion corresponding to the image region in the image. The dominant color of the image region may be determined by a statistical hue histogram. For a specific color histogram statistics technology, refer to a conventional statistics technology. Details are not described in this embodiment.

In this embodiment, the derivative color of the dominant color is a color having a same hue as the dominant color but having a tone, saturation, and brightness different from an HSV of the dominant color.

Figure 20:
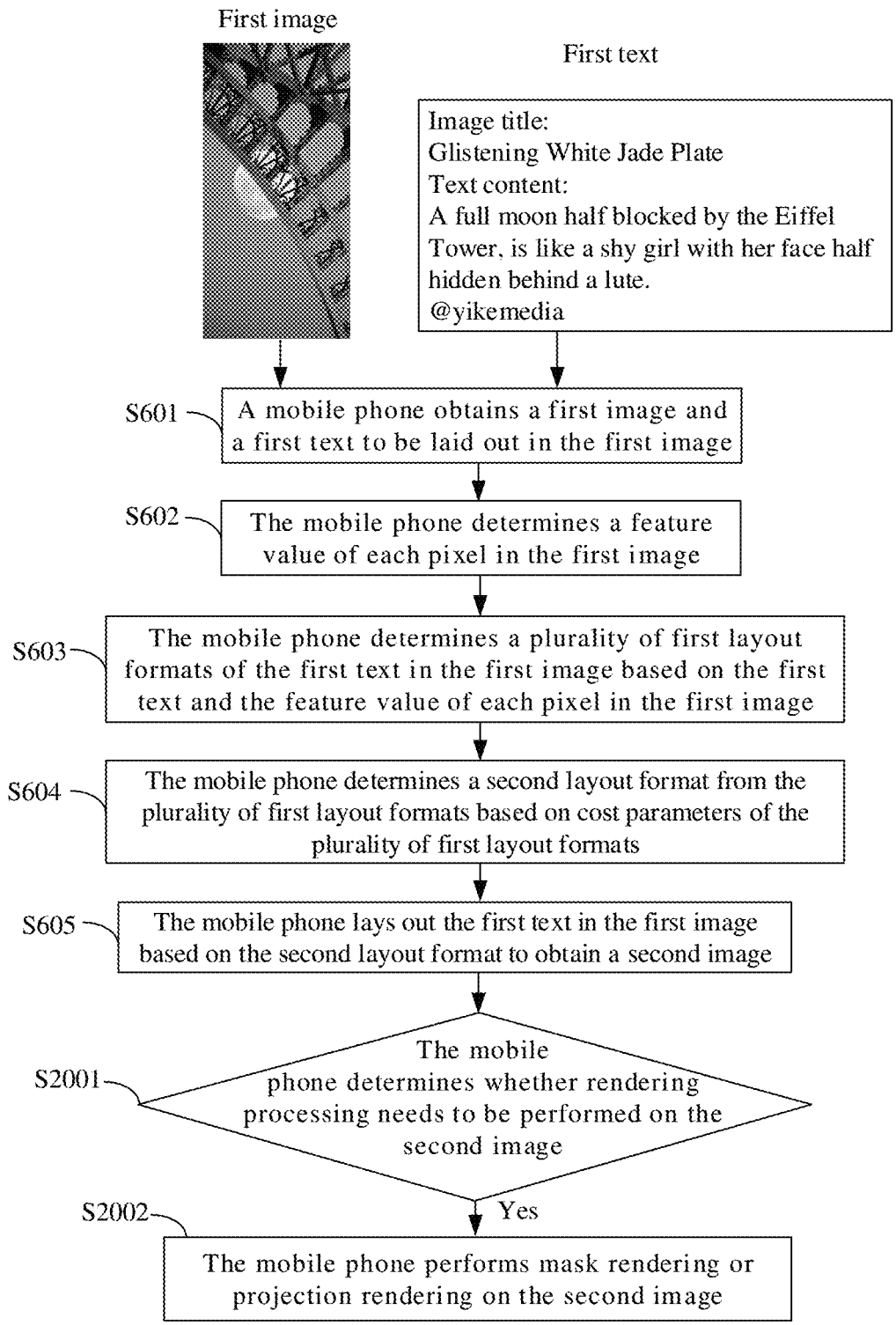
FIG. 20 is a flowchart of another image-text fusion method according to an embodiment.

In some embodiments, after the first text is laid out in the second image based on the second layout format, the first text is blurred or not prominently displayed because a texture of an image region blocked by the first text is too complex or a tone is too complex, or due to other reasons. As shown in FIG. 20, an image-text fusion method in an embodiment may further include:

S2001. The mobile phone determines whether rendering processing needs to be performed on the second image.

Alternatively, for the foregoing third image, the mobile phone determines whether rendering processing needs to be performed on the third image. The rendering processing may include at least one of mask rendering and projection rendering.

In some embodiments, the mobile phone may determine, based on whether at least one of the following conditions is met, whether rendering processing needs to be performed on the second image or the third image:

Condition 1: a texture feature parameter of an image region that is in the first image and is blocked by the first text when the first text is laid out in the first image based on the second layout format is greater than a fourth threshold.

The texture feature parameter is used to represent a quantity of texture features corresponding to the image region in the image. For a calculation method of the texture feature parameter, reference may be made to the edge feature detection algorithm described above, or another conventional edge feature detection algorithm or texture feature detection algorithm. Details are not described herein again.

Condition 2: A proportion of a dominant color of the image region that is in the first image and is blocked by the first text when the first text is laid out in the first image based on the second layout format is less than a fifth threshold.

The proportion of the dominant color of the first image may be determined by collecting hue histograms of the first image. For a specific color histogram statistics technology, refer to a conventional statistics technology. Details are not described in this embodiment.

When the texture feature parameter of the image region that is in the first image and is blocked by the first text is greater than the preset value, it indicates that the texture of the image region may be relatively complex, and text prominence may be affected. In addition, if the proportion of the dominant color of the image region that is in the first image and is blocked by the first text is less than the preset threshold, it indicates that the hue of the image region is complex, and text prominence may also be affected. In this case, the mobile phone may perform rendering processing on the second image, to highlight the first text in the second image.

If the mobile phone meets at least one of the condition 1 and the condition 2, the mobile phone performs S2002.

S2002. The mobile phone performs mask rendering or projection rendering on the second image.

That the mobile phone performs mask rendering on the second image means that the mobile phone performs mask rendering on a character box region of the first text in the second image. That the mobile phone performs projection rendering on the second image means that the mobile phone adds a text shadow to the character of the first text in the second image.

In some embodiments, that the mobile phone performs mask rendering on the second image may include: the mobile phone covers the second image with a mask layer. For example, the mobile phone may cover the character box region of the first text in the second image with a mask layer.

In this embodiment, the mask layer generation method may include: separately expanding a size H1 in at least one direction in an upward direction, a lower direction, a left direction, and a right direction based on a size of the text box of the first text in the second image, to determine a size of the mask layer. Then, transparency processing is performed in the order of transparency threshold 1→transparency threshold 2→transparency threshold 3 to obtain the mask layer. Transparency processing may be performed in a gradient direction such as from top to bottom, from left to right, from bottom to top, or from right to left. The specific gradient direction may depend on a specific layout format.

For example, if the second layout format is middle top, transparency processing may be performed in a gradient direction from top to bottom. This is not limited in this embodiment.

In some other embodiments, that the mobile phone performs mask rendering on the second image may include: the mobile phone determines a mask parameter, and then the mobile phone processes the second image based on the determined mask parameter.

In this embodiment, the mask parameter may include at least a mask size and a mask transparency parameter. The mask size may be determined based on the following method: on a basis of the size of the character box of the first text in the second image, the size H1 is respectively extended in at least one direction of up, down, left, and right, that is, the mask size.

In this embodiment, the mask transparency parameter may be determined based on the following method: determining the mask transparency parameter in an order of transparency threshold 1→transparency threshold 2→transparency threshold 3. The mask transparency parameter may be determined in a gradient direction such as from top to bottom, from left to right, from bottom to top, or from right to left. The specific gradient direction may depend on a specific layout format. For example, if the second layout format is middle top, the mask transparency parameter may be determined in a gradient direction from top to bottom. This is not limited in this embodiment.

Figure 21:
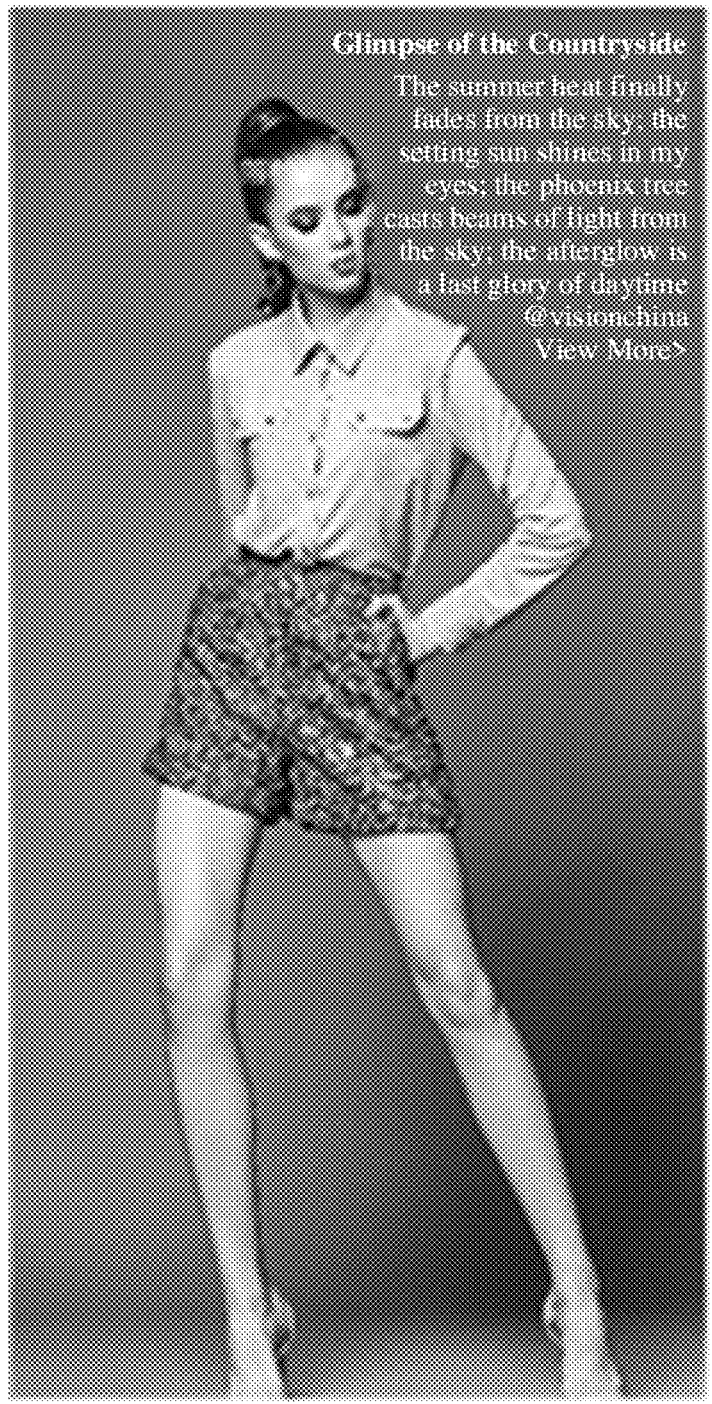
FIG. 21(*a*1), FIG. 21(*b*1), FIG. 21(*a*2), and FIG. 21(*b*2) are comparison diagrams of several image-text fused images according to an embodiment.
Figure 21:
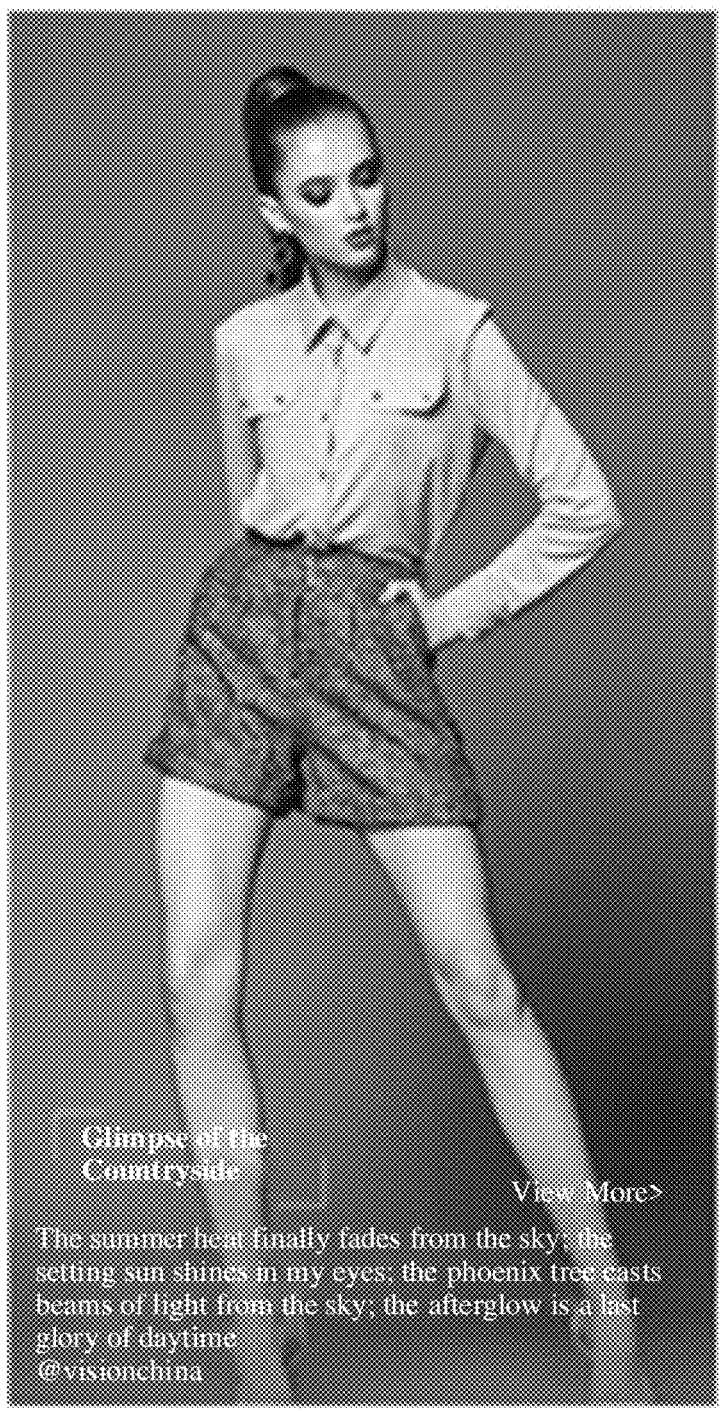
Figure 21:
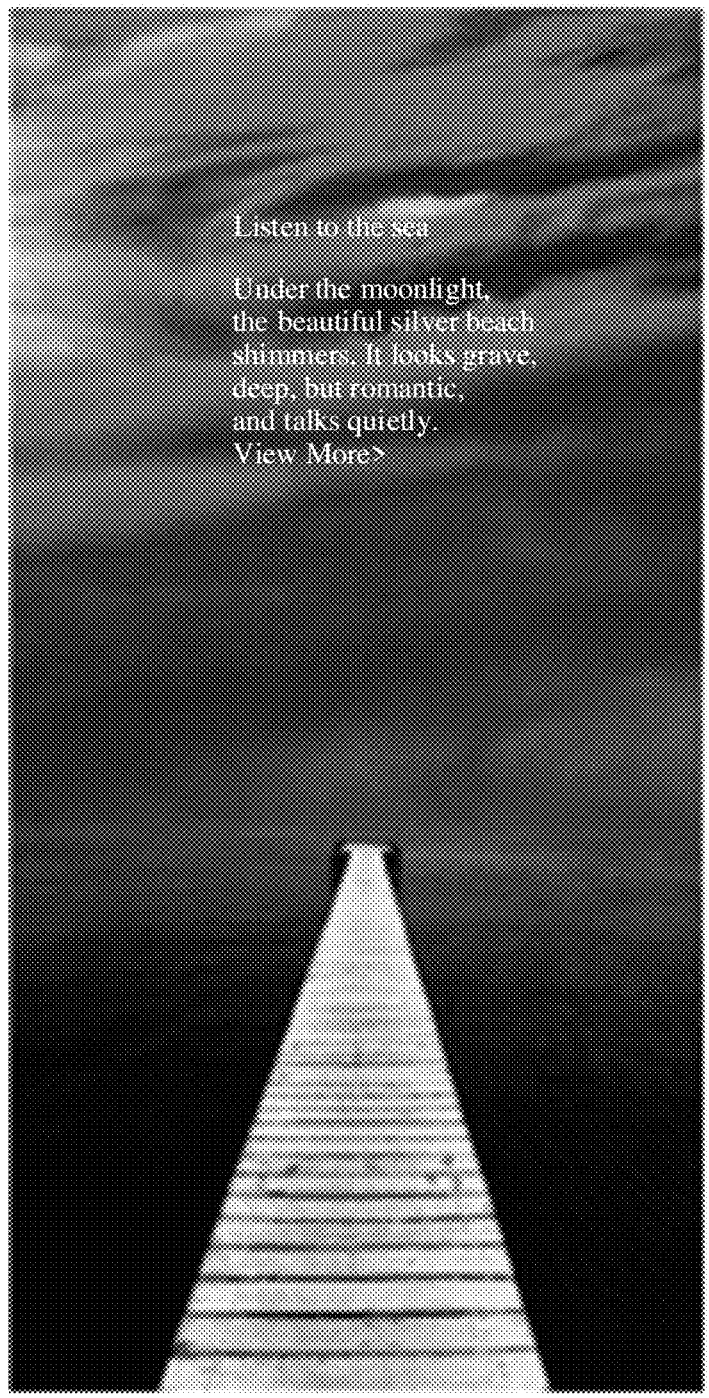
Figure 21:
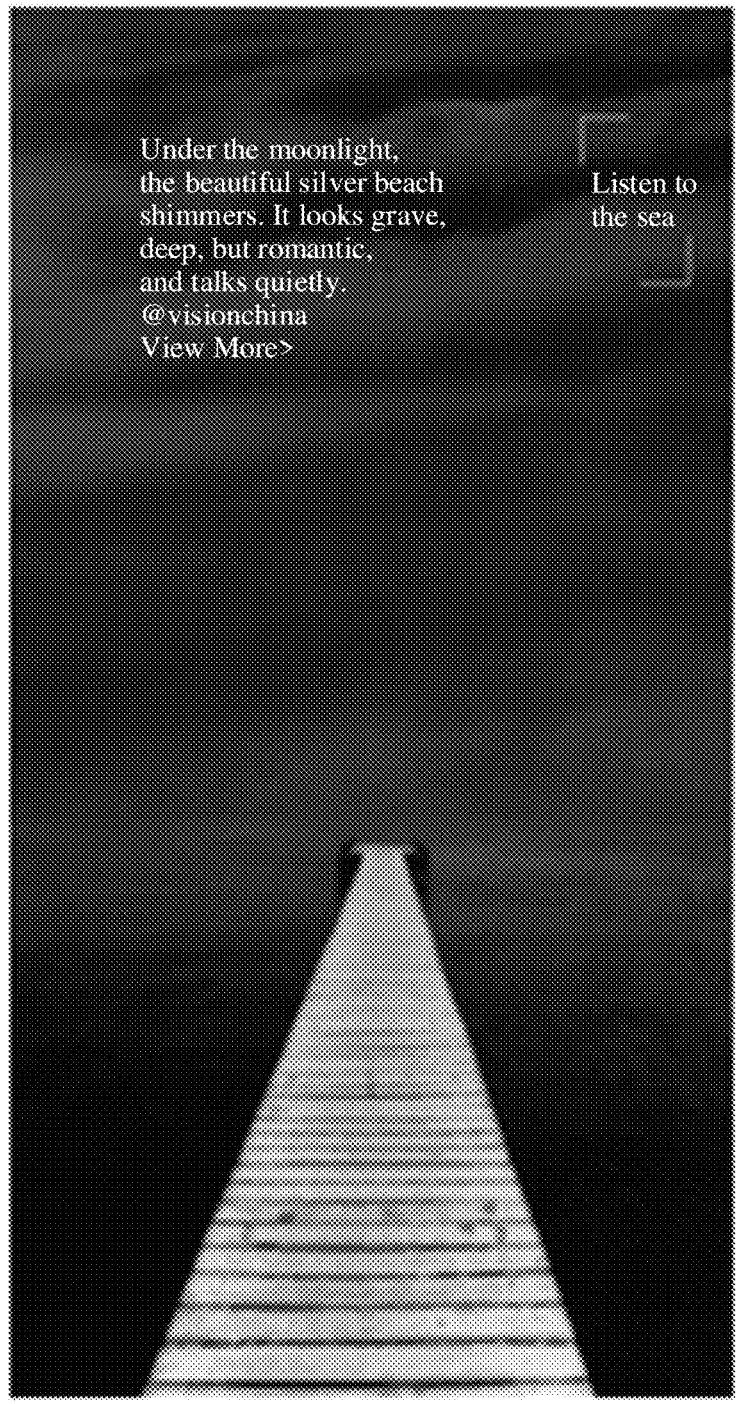

By using the mask processing method, the text in the image-text fused image can be ensured to be prominent, and the text is ensured to be clear and readable. FIG. 21(a1), FIG. 21(b1), FIG. 21(a2), and FIG. 21(b2) are comparison diagrams of several image-text fused images according to an embodiment. For example, FIG. 21(b1) uses the layout method in this embodiment. Compared with an image laid out by using the existing layout method in FIG. 21(a1), a text box setting position is more scientific and a text is more prominent. For another example, FIG. 21(b2) uses the layout method in this embodiment. Compared with an image laid out by using the existing layout method in FIG. 21(a2), image and text color conflict is smaller, and text prominence is stronger.

In some embodiments, that the mobile phone performs projection rendering on the second image may include: the mobile phone determines a text projection parameter, and then the mobile phone processes the second image based on the determined text projection parameter.

In this embodiment, the text projection parameter may include at least a projection color, a projection displacement, a projection blur value, and the like. The projection color may be consistent with the text color. The projection displacement may be a preset displacement parameter. The projected fuzzy value may be a preset fuzzy value, and for example, the projected fuzzy value may be gradually changed with different displacement positions. For a specific method and manner for determining the text projection parameter, refer to a conventional projection rendering technology. This is not limited in this embodiment.

To implement the functions of any one of the foregoing embodiments, the electronic device may include a corresponding hardware structure and/or software module for performing each function. A person skilled in the art should be easily aware that units and algorithm steps described in the embodiments may be implemented by hardware or a combination of hardware and computer software. Whether a function is performed by hardware or hardware driven by computer software depends on constraints of the solutions.

A person skilled in the art may use different methods to implement the described functions, but it should not be considered that the implementation goes beyond the scope.

In this embodiment, function module division may be performed on the electronic device. For example, each function module may be obtained through division corresponding to each function, or two or more functions may be integrated into one processing module. The integrated module may be implemented in a form of hardware or may be implemented in a form of a software function module. It should be noted that, in the embodiments, module division is an example, and is merely a logical function division. In an actual implementation, another division manner may be used.

Figure 22:
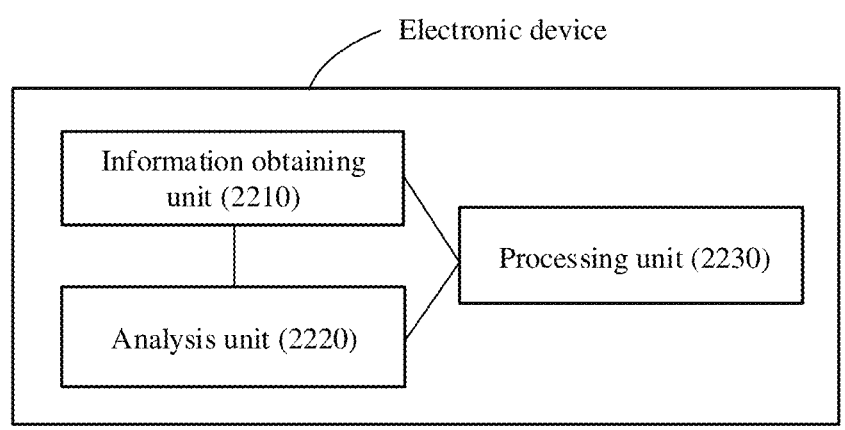
FIG. 22 is a schematic diagram of a structure of an electronic device according to an embodiment.

For example, when functional modules are divided in an integrated manner, FIG. 22 is a schematic structural diagram of an electronic device according to an embodiment. The electronic device may include an information obtaining unit 2210, an analysis unit 2220, and a processing unit 2230.

The information obtaining unit 2210 may be configured to support the electronic device in performing the foregoing step S601, and obtain a plurality of text templates, and/or other processes used for the technology described. The analysis unit 2220 may be configured to support the electronic device in performing the foregoing steps S602, S603, S604, and S2001, or collect first data, and/or other processes for the technology described herein; the processing unit 2230 is configured to support the electronic device in performing the foregoing steps S605 and S2002, and/or other processes of the technology described.

It should be noted that all related content of the steps in the foregoing method embodiments may be cited in function descriptions of corresponding function modules. Details are not described herein.

It should be noted that the electronic device may further include a radio frequency circuit. For example, the electronic device may receive and send a wireless signal by using a radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. The wireless communication may use any communication standard or protocol, including but not limited to a global system for mobile communications, a general packet radio service, code division multiple access, wideband code division multiple access, long term evolution, an e-mail message, a short message service, and the like.

In an optional manner, when software is used to implement data transmission, the data transmission may be implemented completely or partially in a form of a computer program product. The computer program product includes one or more computer instructions. When the computer program instructions are loaded and executed on the computer, the procedure or functions according to the embodiments are completely or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Method or algorithm steps described in combination with the embodiments may be implemented by hardware or may be implemented by a processor by executing software instructions. The software instructions may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Further, the storage medium may be a component of the processor. The processor and the storage medium may be located in an ASIC. In addition, the ASIC may be located in a detection apparatus. Additionally, the processor and the storage medium may alternatively exist in the detection apparatus as discrete components.

The foregoing description about the implementations allows a person skilled in the art to clearly understand that, for the purpose of convenient and brief description, division into only the foregoing function modules is used as an example for description and be allocated to different function modules for implementation as required. In other words, an inner structure of an apparatus is divided into different function modules to implement all or some of the functions described above.

In the several embodiments the disclosed user equipment and method may be implemented in other manners. For example, the described apparatus embodiments are merely examples. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions in the embodiments.

In addition, function units in the embodiments may be integrated into one processing unit, or each of the units may exist alone physically, or two or more units are integrated into one unit. The integrated unit may be implemented in a form of hardware or may be implemented in a form of a software function unit.

When the integrated unit is implemented in a form of a software function unit and sold or used as an independent product, the integrated unit may be stored in a readable storage medium. Based on such an understanding, the solutions in the embodiments essentially, or the part contributing to the conventional technology, or all or some of the solutions may be implemented in a form of a software product. The software product is stored in a storage medium and includes several instructions for instructing a device (which may be a single-chip microcomputer, a chip, or the like) or a processor to perform all or some of the steps of the methods described in the embodiments. The foregoing storage medium includes various media that can store program code, such as a USB flash drive, a removable hard disk, a read-only memory (ROM), a random access memory (RAM), a magnetic disk, and an optical disc.

The foregoing descriptions are merely implementations, but are not intended to limit the protection scope of the embodiments. Any variation or replacement within the scope shall fall within the protection scope of the embodiments.

What is claimed is:

1. An image-text fusion method, wherein the method comprises:
obtaining a first image and a first text to be laid out in the first image;
determining a feature value of each pixel in the first image, wherein a feature value of a pixel is used to represent a probability that a user pays attention to the pixel, wherein the probability that the user pays attention to the pixel is higher for greater feature values of the pixel;
determining a plurality of first layout formats of the first text in the first image based on the first text and the feature value of each pixel in the first image, wherein when the first text is laid out in the first image based on each first layout format, the first text does not block a pixel whose feature value is greater than a first threshold;
determining a second layout format from the plurality of first layout formats based on cost parameters of the plurality of first layout formats, wherein a cost parameter of a first layout format is used to represent a magnitude of a feature value of a pixel blocked by the first text when the first text is laid out in the first image based on the first layout format, and a balance degree of feature value distribution of pixels in each region in the first image in which the first text is laid out; and
laying out the first text in the first image based on the second layout format to obtain a second image.

2. The image-text fusion method according to claim 1, wherein the determining of the feature value of each pixel in the first image further comprises:
determining at least two parameters of a visual saliency parameter, a face feature parameter, an edge feature parameter, and a text feature parameter of each pixel in the first image, wherein the visual saliency parameter of each pixel is used to represent a probability that the respective pixel is a pixel corresponding to a visual saliency feature, the face feature parameter of each pixel is used to represent a probability that the respective pixel is a pixel corresponding to a face, the edge feature parameter of each pixel is used to represent a probability that the respective pixel is a pixel corresponding to an object contour, and the text feature parameter of each pixel is used to represent a probability that the respective pixel is a pixel corresponding to a text; and
separately performing weighted summation on the determined at least two parameters of the visual saliency parameter, the face feature parameter, the edge feature parameter, and the text feature parameter of each pixel in the first image to determine the feature value of each pixel in the first image.

3. The image-text fusion method according to claim 2, wherein before the separately performing weighted summation on the determined at least two parameters of the visual saliency parameter, the face feature parameter, the edge feature parameter, and the text feature parameter of each pixel in the first image to determine the feature value of each pixel in the first image, the method further comprises:
separately generating at least two feature maps based on the determined at least two parameters of the visual saliency parameter, the face feature parameter, the edge feature parameter, and the text feature parameter of each pixel in the first image, wherein a pixel value of each pixel in each feature map is a corresponding parameter of the corresponding pixel; and
the separately performing weighted summation on the determined at least two parameters of the visual saliency parameter, the face feature parameter, the edge feature parameter, and the text feature parameter of each pixel in the first image to determine the feature value of each pixel in the first image comprises:
performing weighted summation on pixel values of each pixel in the at least two feature maps to determine the feature value of each pixel in the first image.

4. The image-text fusion method according to claim 1, wherein the determining of the plurality of first layout formats of the first text in the first image based on the first text and the feature value of each pixel in the first image further comprises:
determining the plurality of first layout formats based on the feature value of each pixel in the first image and a size of a text box of the first text when the first text is laid out by using one or more text templates.

5. The image-text fusion method according to claim 4, further comprising:
obtaining the one or more text templates, wherein each of the one or more text templates specifies at least one of a line spacing, a line width, a font size, a font, a character thickness, an alignment mode, a decorative line position, and a decorative line thickness of a text.

6. The image-text fusion method according to claim 1, wherein determining of the second layout format from the plurality of first layout formats based on the cost parameters of the plurality of first layout formats further comprises:
determining a texture feature parameter of an image region that is in the first image and is blocked by the text box of the first text when the first text is laid out in the first image based on the plurality of first layout formats separately, wherein the texture feature parameter is used to represent a quantity of texture features corresponding to the image region in the image;
selecting, from the plurality of first layout formats, a plurality of first layout formats corresponding to image regions whose texture feature parameters are less than a second threshold; and
determining the second layout format from the plurality of selected first layout formats based on a cost parameter of each selected first layout format.

7. The image-text fusion method according to claim 1, further comprising:
performing at least two of step a, step b, and step c, and step d for each of the plurality of first layout formats, to obtain a cost parameter of each first layout format:
step a: calculating a text intrusion parameter of the first text when the first text is laid out in the first image based on a first layout format, wherein the text intrusion parameter is a ratio of a first parameter to a second parameter, wherein the first parameter is a sum of feature values of pixels in an image region blocked by the first text in the first image, and the second parameter is an area of the image region, or the second parameter is a total quantity of pixels in the image region, or the second parameter is a product of a total quantity of pixels in the image region and a preset value;

step b: calculating a visual space occupation parameter of the first text when the first text is laid out in the first image based on the first layout format, wherein the visual space occupation parameter is used to represent a proportion of pixels whose feature values are less than a third threshold in the image region;

step c: calculating a visual balance parameter of the first text when the first text is laid out in the first image based on the first layout format, wherein the visual balance parameter is used to represent a degree of impact of the first text on the balance degree of feature value distribution of pixels in each region in the first image in which the first text is laid out; and step d: calculating a cost parameter of the first layout format based on at least two of the calculated text intrusion parameter, the visual space occupation parameter, and the visual balance parameter of the first text.

8. The image-text fusion method according to claim 7, wherein calculating of the cost parameter of the first layout format based on at least two of the calculated text intrusion parameter, the visual space occupation parameter, and the visual balance parameter of the first text further comprises: using $$T_i = \lambda_1 * E_s(L_i) + \lambda_2 * E_u(L_i) + \lambda_3 * E_n(L_i); \text{ or}$$

$$T_i = (\lambda_1 * E_s(L_i) + \lambda_2 * E_u(L_i)) * E_n(L_i), \text{ or}$$

$$T_i = E_s(L_i) * E_u(L_i) * E_n(L_i)$$

to calculate the cost parameter $T_i$ of the first layout format, wherein $E_s(L_i)$ is the text intrusion parameter of the first text when the first text is laid out in the first image based on the first layout format, $E_u(L_i)$ is the visual space occupation parameter of the first text when the first text is laid out in the first image based on the first layout format, $E_n(L_i)$ is the visual balance parameter of the first text when the first text is laid out in the first image based on the first layout format, and $\lambda_1, \lambda_2,$ and $\lambda_3$ are weight parameters corresponding to $E_s(L_i)$, and $E_u(L_i)$ $E_n(L_i)$.

9. The image-text fusion method according to claim 8, wherein the determining of the second layout format from the plurality of first layout formats based on the cost parameters of the plurality of first layout formats further comprises:

determining that a first layout format corresponding to a smallest cost parameter among the cost parameters of the plurality of first layout formats is the second layout format.

10. The image-text fusion method according to claim 1, further comprising:

determining a color parameter of the first text, wherein the color parameter of the first text is a derivative color of a dominant color of an image region blocked by the first text in the first image when the first text is laid out in the first image based on the second layout format, and the derivative color of the dominant color is a color having a same hue as the dominant color but having a tone, saturation, and brightness different from an HSV of the dominant color; and coloring the first text in the second image based on the color parameter of the first text to obtain a third image.

11. The image-text fusion method according to claim 10, wherein the dominant color of the image region blocked by the first text in the first image is determined based on tones, saturation, and brightness of three primary colors RGB of the image region blocked by the first text in the first image in an HSV space when the first text is laid out in the first image based on the second layout format; and the dominant color is a hue with a highest proportion in the image region.

12. The image-text fusion method according to claim 1, further comprising:

determining to perform rendering processing on the second image if at least one of the following condition 1 and condition 2 is met:

condition 1: a texture feature parameter of an image region that is in the first image and is blocked by the first text when the first text is laid out in the first image based on the second layout format is greater than a fourth threshold, wherein the texture feature parameter is used to represent a quantity of texture features corresponding to the image region in the image; and condition 2: a proportion of a dominant color of the image region is less than a fifth threshold; and covering the second image with a mask layer; or determining a mask parameter, and processing the second image based on the determined mask parameter; or performing projection rendering on the first text.

13. The image-text fusion method according to claim 10, further comprising:

determining to perform rendering processing on the third image if at least one of the following condition 1 and condition 2 is met:

condition 1: a texture feature parameter of an image region that is in the first image and is blocked by the first text when the first text is laid out in the first image based on the second layout format is greater than a fourth threshold, wherein the texture feature parameter is used to represent a quantity of texture features corresponding to the image region in the image; and condition 2: a proportion of a dominant color of the image region is less than a fifth threshold; and covering the third image with a mask layer; or determining a mask parameter, and processing the third image based on the determined mask parameter; or performing projection rendering on the first text.

14. A non-transitory computer-readable storage medium, wherein the non-transitory computer-readable storage medium stores computer-executable instructions, and when the computer-executable instructions are executed by a processing circuit, the image-text fusion method according to claim 1 is implemented.

15. An image-text fusion apparatus comprising a memory configured to store one or more computer programs and a processor configured to execute the one or more computer programs stored in the memory, wherein the processor is configured to:

obtain a first image and a first text to be laid out in the first image;

determine a feature value of each pixel in the first image, wherein a feature value of a pixel is used to represent a probability that a user pays attention to the pixel, wherein the probability that the user pays attention to the pixel is higher for greater feature values of the pixel;

determine a plurality of first layout formats of the first text in the first image based on the first text and the feature value of each pixel in the first image, wherein when the first text is laid out in the first image based on each first layout format, the first text does not block a pixel whose feature value is greater than a first threshold; and determine a second layout format from the plurality of first layout formats based on cost parameters of the plurality of first layout formats, wherein a cost parameter of a first layout format is used to represent a magnitude of a feature value of a pixel blocked by the first text when the first text is laid out in the first image based on the first layout format, and a balance degree of feature value distribution of pixels in each region in the first image in which the first text is laid out; and lay out the first text in the first image based on the second layout format to obtain a second image.

16. The image-text fusion apparatus according to claim 15, wherein the processor is further configured to determine at least two parameters of a visual saliency parameter, a face feature parameter, an edge feature parameter, and a text feature parameter of each pixel in the first image, wherein the visual saliency parameter of each pixel is used to represent a probability that the respective pixel is a pixel corresponding to a visual saliency feature, the face feature parameter of each pixel is used to represent a probability that the respective pixel is a pixel corresponding to a face, the edge feature parameter of each pixel is used to represent a probability that the respective pixel is a pixel corresponding to an object contour, and the text feature parameter of each pixel is used to represent a probability that the respective pixel is a pixel corresponding to a text; and the processor is configured to separately performs weighted summation on the determined at least two parameters of the visual saliency parameter, the face feature parameter, the edge feature parameter, and the text feature parameter of each pixel in the first image to determine the feature value of each pixel in the first image.

17. The image-text fusion apparatus according to claim 16, wherein before the processor separately performs weighted summation on the determined at least two parameters of the visual saliency parameter, the face feature parameter, the edge feature parameter, and the text feature parameter of each pixel in the first image to determine the feature value of each pixel in the first image, the processor is further configured to:

separately generate at least two feature maps based on the determined at least two parameters of the visual saliency parameter, the face feature parameter, the edge feature parameter, and the text feature parameter of each pixel in the first image, wherein a pixel value of each pixel in each feature map is a corresponding parameter of the corresponding pixel; and the separately performing weighted summation on the determined at least two parameters of the visual saliency parameter, the face feature parameter, the edge feature parameter, and the text feature parameter of each pixel in the first image to determine the feature value of each pixel in the first image comprises:

performing weighted summation on pixel values of each pixel in the at least two feature maps to determine the feature value of each pixel in the first image.

18. The image-text fusion apparatus according to claim 15, wherein the processor is further configured to determine the plurality of first layout formats based on the feature value of each pixel in the first image and a size of a text box of the first text when the first text is laid out by using one or more text templates.

19. The image-text fusion apparatus according to claim 18, wherein the processor is further configured to:

obtain the one or more text templates, wherein each of the one or more text templates specifies at least one of a line spacing, a line width, a font size, a font, a character thickness, an alignment mode, a decorative line position, and a decorative line thickness of a text.

20. The image-text fusion apparatus according to claim 15, wherein the processor is further configured to determine a texture feature parameter of an image region that is in the first image and is blocked by the text box of the first text when the first text is laid out in the first image based on the plurality of first layout formats separately, wherein the texture feature parameter is used to represent a quantity of texture features corresponding to the image region in the image;

the processor is configured to select, from the plurality of first layout formats, a plurality of first layout formats corresponding to image regions whose texture feature parameters are less than a second threshold; and the processor is configured to determine the second layout format from the plurality of selected first layout formats based on a cost parameter of each selected first layout format.

* * * * *

UNITED STATES PATENT AND TRADEMARK OFFICE
CERTIFICATE OF CORRECTION

PATENT NO. : 12,254,544 B2
APPLICATION NO. : 17/634002
DATED : March 18, 2025
INVENTOR(S) : Wenjie Zhang et al.

Page 1 of 1

It is certified that error appears in the above-identified patent and that said Letters Patent is hereby corrected as shown below:

In the Claims

Column 43, Claim 16, Lines 36 and 37, please change from "the processor is configured to separately performs," to "the processor is configured to separately perform".

Signed and Sealed this
Tenth Day of June, 2025

Coke Morgan Stewart
*Acting Director of the United States Patent and Trademark Office*